(12) United States Patent
Booten et al.

(10) Patent No.: US 10,760,795 B2
(45) Date of Patent: Sep. 1, 2020

(54) SPLIT HEATING AND COOLING SYSTEMS

(71) Applicant: Alliance for Sustainable Energy, LLC, Golden, CO (US)

(72) Inventors: Charles William Booten, Arvada, CO (US); Jonathan Michael Winkler, Littleton, CO (US); David Ross Roberts, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 84 days.

(21) Appl. No.: 16/175,124

(22) Filed: Oct. 30, 2018

(65) Prior Publication Data

US 2019/0072286 A1 Mar. 7, 2019

Related U.S. Application Data

(63) Continuation of application No. 15/805,357, filed on Nov. 7, 2017, now Pat. No. 10,156,369, which is a
(Continued)

(51) Int. Cl.
*F24F 1/32* (2011.01)
*F24F 1/26* (2011.01)
(Continued)

(52) U.S. Cl.
CPC .............. *F24F 1/32* (2013.01); *F16L 5/10* (2013.01); *F16L 29/04* (2013.01); *F16L 37/32* (2013.01);
(Continued)

(58) Field of Classification Search
CPC .......... F24F 1/027; F24F 1/031; F24F 1/0314; F24F 2221/17; F24F 1/32; F24F 1/26; F24F 1/34
See application file for complete search history.

(56) References Cited

U.S. PATENT DOCUMENTS 2,708,833 A 5/1955 Nigro
2,708,835 A 5/1955 Nigro
(Continued)

FOREIGN PATENT DOCUMENTS

JP 60 259845 A 12/1985
JP 08-312135 11/1996
(Continued)

OTHER PUBLICATIONS

"Perfect Aire 12,000 BTU / 15 Seer Quick Connect Ductless Mini-Split with 11,500 BTU Heat Pump", Installation Manual, accessed Nov. 6, 2017, available at http://www.perfectaire.us/assets/1pamshqcw12-15_1pamshqco12-15_usermanual_hr.pdf, pp. 1-16.
(Continued)

*Primary Examiner* — Cassey D Bauer
(74) *Attorney, Agent, or Firm* — Alexandra M. Hall; Michael A. McIntyre

(57) ABSTRACT

The present disclosure relates to air conditioning systems and methods. An aspect of the present disclosure is a device that includes a housing having an external surface and defining an interior volume, a heat exchanger positioned within the interior volume, a fluid line partially positioned within the interior volume, a sleeve extending from the external surface and terminating at a distal end of the sleeve, and a fluid connector. The sleeve has an outside wall spanning a length of the sleeve and defining an internal cavity, the fluid connector is positioned at or near the distal end, a portion of the fluid line is positioned within the internal cavity, and the fluid line provides a fluid connection between the heat exchanger and the fluid connector.

13 Claims, 19 Drawing Sheets

Related U.S. Application Data continuation of application No. PCT/US2016/032008, filed on May 12, 2016.

(60) Provisional application No. 62/254,324, filed on Nov. 12, 2015, provisional application No. 62/204,855, filed on Aug. 13, 2015, provisional application No. 62/160,307, filed on May 12, 2015.

(51) Int. Cl.

| | | |
|---|---|---|
| *F24F 1/027* | (2019.01) | |
| *F16L 5/10* | (2006.01) | |
| *F16L 29/04* | (2006.01) | |
| *F16L 37/32* | (2006.01) | |
| *F16L 37/34* | (2006.01) | |
| *F24F 13/02* | (2006.01) | |
| *F24F 1/16* | (2011.01) | |
| *F16L 11/22* | (2006.01) | |
| *F24F 1/34* | (2011.01) | |

(52) U.S. Cl.
CPC ............ *F16L 37/34* (2013.01); *F24F 1/027* (2013.01); *F24F 1/16* (2013.01); *F24F 1/26* (2013.01); *F24F 13/02* (2013.01); *F24F 13/0209* (2013.01); *F16L 11/22* (2013.01); *F24F 1/34* (2013.01); *F24F 13/0227* (2013.01); *F24F 2221/17* (2013.01)

(56) References Cited

U.S. PATENT DOCUMENTS

| | | |
|---|---|---|
| 2,712,737 A | 7/1955 | Palmer |
| 2,771,308 A | 11/1956 | Vitcha et al. |
| 3,611,743 A | 10/1971 | Manganaro |
| 3,665,727 A | 5/1972 | Mather |
| 3,911,693 A | 10/1975 | Seigler et al. |
| 4,138,859 A | 2/1979 | Pietsch |
| 4,641,503 A | 2/1987 | Kobayashi |
| 4,733,543 A | 3/1988 | Blair |
| 5,074,120 A | 12/1991 | Kitamoto |
| 5,191,770 A | 3/1993 | Kim |
| 5,277,402 A | 1/1994 | Szabo |
| 5,293,758 A | 3/1994 | Ames et al. |
| 5,582,025 A | 12/1996 | Dubin et al. |
| 5,661,891 A | 9/1997 | Miller et al. |
| 5,692,385 A | 12/1997 | Hollenbeck et al. |
| 6,058,971 A | 5/2000 | Palmer et al. |
| 6,082,127 A | 7/2000 | Correa |
| 6,102,062 A | 8/2000 | Pearl, II et al. |
| 6,138,987 A | 10/2000 | Lee |
| 6,199,396 B1 | 3/2001 | Aizawa |
| 6,230,510 B1 | 5/2001 | Price |
| 6,336,338 B1 | 1/2002 | Koren |
| 7,013,665 B2 | 3/2006 | Matsuoka |
| 7,121,592 B2 | 10/2006 | Sazbo et al. |
| 8,104,303 B2 | 1/2012 | Murata et al. |
| 8,887,762 B2 | 11/2014 | Densel et al. |
| 2003/0110789 A1 | 6/2003 | Cur et al. |
| 2009/0107162 A1 | 4/2009 | Su et al. |
| 2010/0229585 A1 | 9/2010 | Bradford et al. |
| 2011/0219795 A1 | 9/2011 | Ahn et al. |
| 2012/0318005 A1 | 12/2012 | Lingrey et al. |
| 2013/0241194 A1 | 9/2013 | Petterson et al. |
| 2014/0144176 A1 | 5/2014 | Luo |
| 2014/0208776 A1 | 7/2014 | Hu et al. |
| 2015/0047276 A1 | 2/2015 | Gandolfo et al. |
| 2015/0089973 A1 | 4/2015 | Kobayashi |
| 2018/0080668 A1 | 3/2018 | Booten et al. |

FOREIGN PATENT DOCUMENTS

| | | |
|---|---|---|
| JP | 2000-000422 | 1/2000 |
| JP | 3150782 | 5/2009 |
| JP | 2010-127489 A | 6/2010 |
| WO | 99/67535 | 12/1999 |
| WO | WO 99/67535 | 12/1999 |
| WO | 03/095884 A1 | 11/2003 |
| WO | WO 03/095884 A1 | 11/2003 |
| WO | 2009/110871 A1 | 9/2009 |

OTHER PUBLICATIONS

Winkler, "Laboratory Test Report for Fujitsu 12RLS and Mitsubishi FE12NA Mini-Split Heat Pumps", Building America, Sep. 2011, pp. 1-43.

Winkler et al., "Laboratory Performance Testing of Residential Window Air Conditioners", NREL Technical Report NREL/TP-5500-57617, Mar. 2013, pp. 1-61.

International Search Report and Written Opinion for International (PCT) Application No. PCT/US2016/32008, dated Aug. 19, 2016, pp. 1-11.

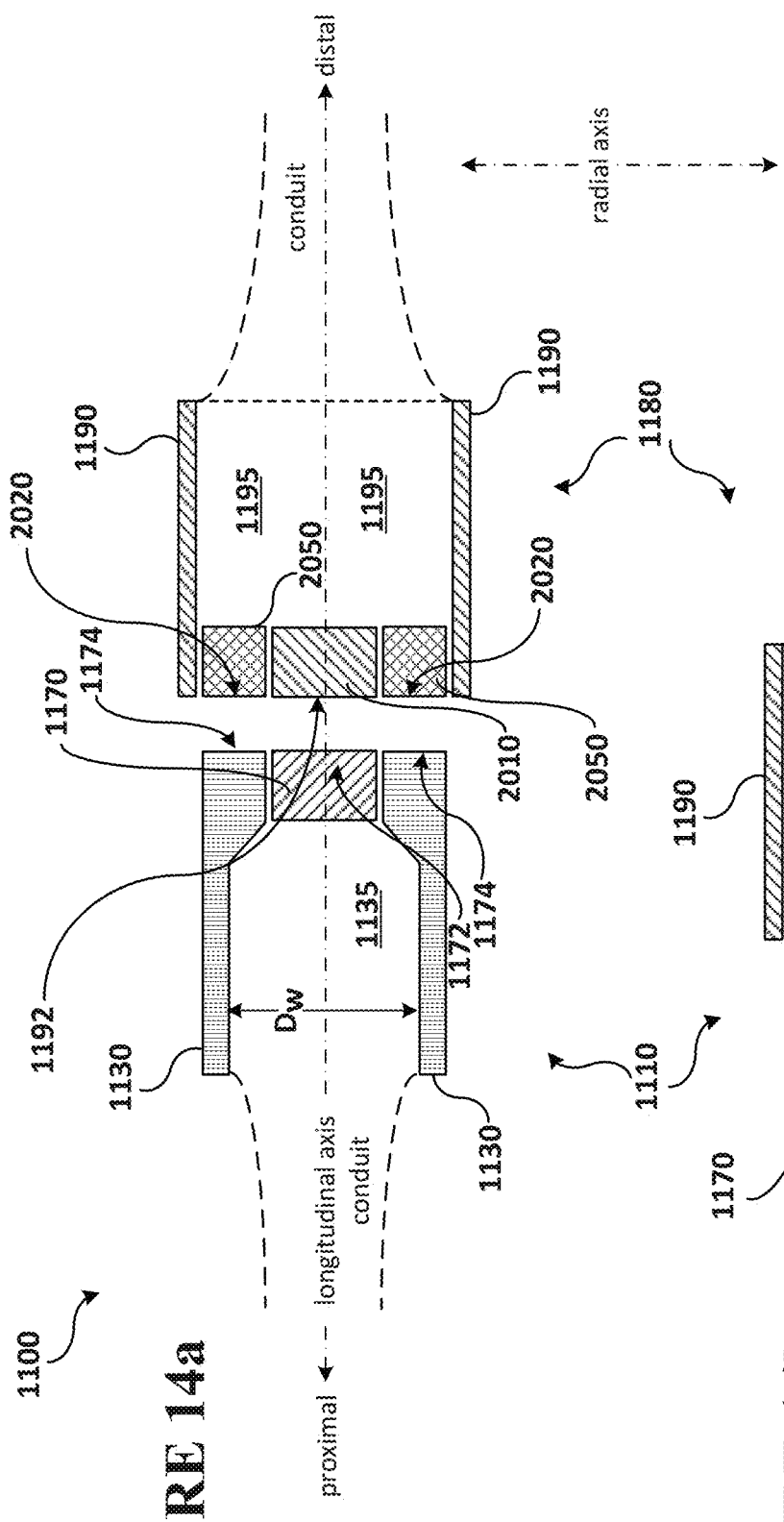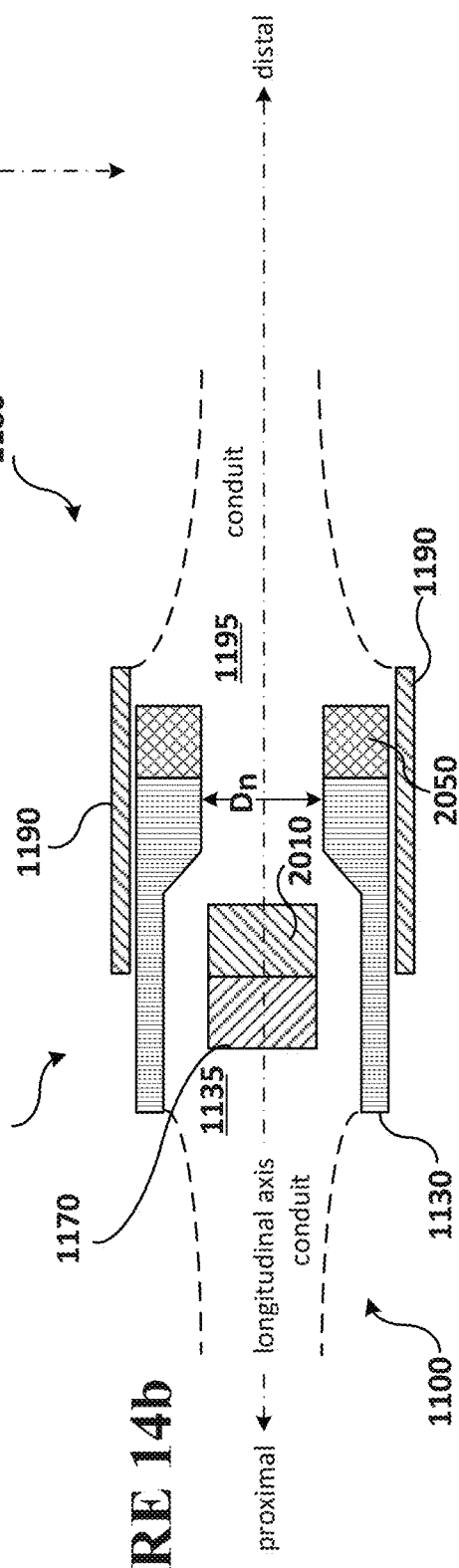

SPLIT HEATING AND COOLING SYSTEMS

CROSS-REFERENCE TO RELATED APPLICATIONS

This application claims the benefit of U.S. Provisional Application Nos. 62/160,307, 62/204,855, and 62/254,324, filed May 12, 2015, Aug. 13, 2015, and Nov. 12, 2015, respectively, the contents of which are incorporated herein by reference in their entirety. This application is a continuation of U.S. Nonprovisional application Ser. No. 15/805,357 filed Nov. 17, 2017, which is a continuation of International Application PCT/US2016/032008 filed May 12, 2016, the contents of which are incorporated herein by reference in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Air conditioning of building spaces consumes large amounts of energy in the United States and elsewhere. It drives electricity usage during peak electricity demand and is the single largest user of electricity in U.S. buildings. Thus, reducing energy consumption requires innovative and cost-effective solutions for conditioning building spaces.

Residential construction practices are progressing towards conditioning technologies with higher energy efficiencies. However, current heating and cooling systems do not typically offer capacities suitable for low-load homes, while installation of over-sized heating and cooling systems into low-load homes results in unnecessary, excessive costs and reduces the efficiencies of the conditioning systems. One alternative is the room air conditioner. However, room air conditioners have not been a popular choice for newly constructed, single family homes due to their poor aesthetics and the desire for uniform climate conditions throughout the entirety of a home. More complicated systems tend to be more difficult and expensive to install and custom designed for each particular installation.

Thus, a need remains for efficient, inexpensive, and attractive space conditioning systems. Also desirable, are systems that effectively provide uniform space conditioning throughout low-load homes and higher cooling capacities than traditional room air conditioners. In addition, such systems should be easily installed by the homeowner or renter, while minimizing exposure to and loss of refrigeration fluids from the air conditioning system.

SUMMARY

An aspect of the present disclosure is a device that includes a housing having an external surface and defining an interior volume, a heat exchanger positioned within the interior volume, a fluid line partially positioned within the interior volume, a sleeve extending from the external surface and terminating at a distal end of the sleeve, and a fluid connector. The sleeve has an outside wall spanning a length of the sleeve and defining an internal cavity, the fluid connector is positioned at or near the distal end, a portion of the fluid line is positioned within the internal cavity, and the fluid line provides a fluid connection between the heat exchanger and the fluid connector.

In some embodiments of the present disclosure, the outside wall may include a receiving, and the receiving hole may pass completely through the outside wall. In some embodiments of the present disclosure, the device may include a guiding edge positioned on the outside wall of the sleeve, and the guiding edge may be substantially parallel with the length of the sleeve. In some embodiments of the present disclosure, the sleeve may be positioned substantially perpendicular relative to the external surface.

In some embodiments of the present disclosure, the device may include a connecting head, where the connecting head may be positioned at the distal end of the sleeve, and the fluid connector may be positioned at a fixed position on the connecting head. In some embodiments of the present disclosure, the sleeve may include a first connector tube and a second connector tube, the first connector tube may have a first end and a second end that defines a first length, and the first connector tube may have a first wall that spans the first length and defines a first internal cavity. The second connector tube may have a first end and a second end that defines a second length, and the second connector tube may have a second wall that spans the second length and defines a second internal cavity. The first connector tube may have a receiving hole positioned in the first wall, the second connector tube may have an arrest mechanism, the arrest mechanism may be reversibly movable from a locked position within the receiving hole, to an unlocked position outside of the receiving hole, and the first connector tube may be movable with respect to the second connector tube when the arrest mechanism is in the unlocked position.

In some embodiments of the present disclosure, the device may include a motor and a fan, where the motor and the fan may positioned within the interior volume, and the fan may be mechanically coupled to the motor by a drive mechanism. In some embodiments of the present disclosure, the fluid line may include a liquid line and a vapor line, each of which is connected to the heat exchanger, the connector may include a first connector and a second connector, the vapor line may attach to the first fluid connector, and the liquid line may attach to the second fluid connector.

An aspect of the present disclosure is a device that includes a housing having an external surface and defining an interior volume, a heat exchanger positioned within the interior volume, a fluid line positioned within the interior volume, a channel extending into the interior volume from the external surface, and a fluid connector positioned at least partially within the channel, where the fluid line provides a fluid connection between the heat exchanger and the fluid connector.

In some embodiments of the present disclosure, the channel may define an inside wall, and an arrest mechanism may be positioned within the inside wall. In some embodiments of the present disclosure, the device may include a guiding groove positioned on the inside wall of the channel, where the guiding groove may be substantially parallel with the channel. In some embodiments of the present disclosure, the channel may be positioned substantially perpendicular relative to the external surface. In some embodiments of the present disclosure, the device may include a face plate, where the channel may terminate with the face plate at an end of the channel that may be within the interior volume, and the fluid connector may be positioned at a fixed position on the face plate. In some embodiments of the present disclosure, the device may include a motor and a fan, where the motor and the fan may be positioned within the interior volume, and the fan may be mechanically coupled to the motor by a drive mechanism. In some embodiments of the present disclosure, the fluid line may include a liquid line and a vapor line, each of which may be connected to the heat exchanger, the connector may include a first connector and a second connector, the vapor line may attach to the first fluid connector, and the liquid line may attach to the second fluid connector.

An aspect of the present disclosure is a system that includes a first unit and a second unit. The first unit includes a first housing having a first external surface and defining a first interior volume, a first heat exchanger positioned within the first interior volume, a first fluid line partially positioned within the first interior volume, a sleeve extending from the first external surface and terminating at a distal end, and a first part of a fluid connector. The sleeve has an outside wall spanning a length of the sleeve and defining an internal cavity, the first part of the fluid connector is positioned at or near the distal end, a portion of the first fluid line is positioned within the internal cavity, and the first fluid line provides a fluid connection between the first heat exchanger and the first part of the fluid connector. The second unit includes a second housing having a second external surface and defining a second interior volume, a second heat exchanger positioned within the second interior volume, a second fluid line positioned within the second interior volume, a channel extending into the second interior volume from the second external surface, and a second part of the fluid connector positioned within the channel. The second fluid line provides a second fluid connection between the second heat exchanger and the second part of the fluid connector. The outside wall includes a receiving hole, the inside wall includes an arrest mechanism, and the sleeve is positioned within the channel. The sleeve has a first position, where the arrest mechanism is positioned outside of the receiving hole such that the sleeve is movable in a direction substantially parallel to the length. The sleeve has a second position, where the arrest mechanism is positioned substantially within the receiving hole such that the sleeve is not movable in the direction substantially parallel to the length, and the first part and the second part are physically connected to form a liquid seal that allows a fluid to be transferred between the first heat exchanger and the second heat exchanger.

An aspect of the present disclosure is a method that includes inserting a sleeve of a first unit through a hole positioned in a wall having a first surface and a second surface, such that a distal end of the sleeve protrudes from the second surface of the wall, securing the first unit to the wall by fastening a locking mechanism to the distal end; placing the distal end in a channel that penetrates into a first surface of a housing of a second unit, moving the second unit to a desired position relative to the wall by moving the distal end into the channel, and securing the second unit to the first unit using at least one arrest mechanism positioned at least within the channel or on the sleeve. The securing the second unit to the first unit provides a fluid connection between the first unit and the second unit.

In some embodiments of the present disclosure, the method may include, before the inserting, forming the hole in the wall, such that the hole passes completely through a thickness of the wall. In some embodiments of the present disclosure, the forming may produce a hole that is positioned substantially perpendicular relative to at least one of the first surface of the wall or the second surface of the wall. In some embodiments of the present disclosure, the method may include, prior to the inserting, placing a first gasket around the sleeve. In some embodiments of the present disclosure, the method may include, prior to the placing the distal end in the channel, placing a second gasket around the distal end. In some embodiments of the present disclosure, the method may include, prior to the inserting, attaching a securement plate, the securement plate comprising a hole passing through the securement plate, to the second surface of the wall, where the inserting the sleeve further may include inserting the sleeve through the hole of the securement plate. In some embodiments of the present disclosure, the fastening the locking mechanism may include at least one of threading or ratcheting the locking mechanism onto the distal end of the sleeve.

DRAWINGS

Some embodiments are illustrated in referenced figures of the drawings. It is intended that the embodiments and figures disclosed herein are to be considered illustrative rather than limiting.

FIGS. 14a and 14b illustrate two parts of a fluid connector, both in a first position FIG. 14a, where the two parts are not connected with no fluid flow, and in a second position FIG. 14b, where the two parts are connected to allow fluid flow through the two parts, according to embodiments of the present disclosure.

Figure 18A:
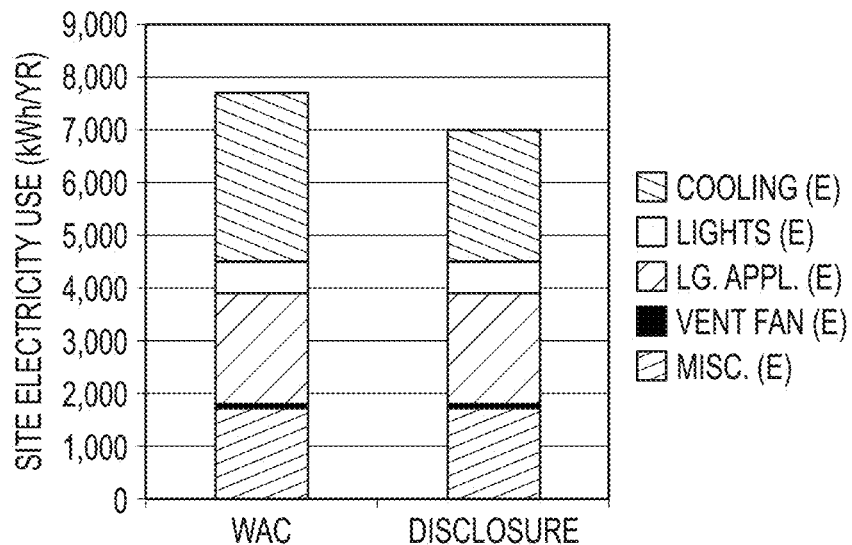
Figure 18B:
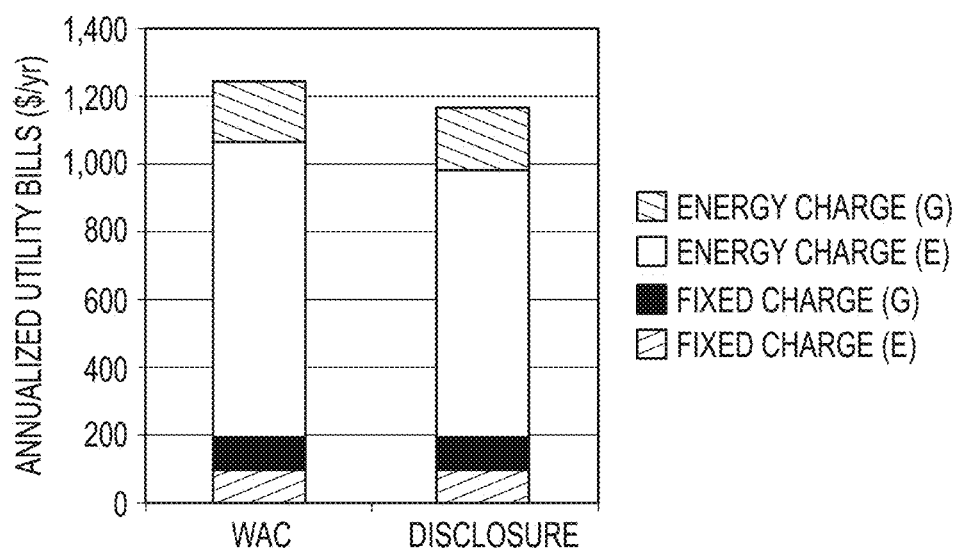

FIGS. 18a and 18b illustrate predicted energy and utility bill savings based on building simulations using EcoSnap-AC relative to a window air conditioner in Phoenix, Ariz., The simulated space was 400 sqft which is representative of the floor area that would be conditioned by these products. Construction was typical of 1980's homes. The simulation engine used was EnergyPlus which was DOE's flagship building simulation tool. Cooling energy savings is over 20%, estimated utility bill savings is $35/year. Utility bill savings includes heating and cooling energy and accounts for reductions in unwanted air infiltration to the living space.

REFERENCE NUMBERS

100 . . . air conditioning system
110 . . . wall
115 . . . hole
120 . . . condenser unit
125 . . . first unit
127 . . . first housing
130 . . . evaporator unit
135 . . . second unit
137 . . . second housing
140 . . . first gasket
150 . . . second gasket
155 . . . first attachment
157 . . . second attachment
160 . . . channel
170 . . . sleeve
175 . . . flange
180 . . . drive mechanism
190 . . . spring
200 . . . receiving hole
210 . . . arrest mechanism
220 . . . face plate
230 . . . guiding groove
240 . . . guiding edge
250 . . . drive receiver
255 . . . arrest track
260 . . . spring
270 . . . fluid connector
280 . . . electrical connector
290 . . . refrigerant connector
300 . . . fluid line
310 . . . electrical line
320 . . . refrigerant line
500-1 . . . outer locking collar
500-2 . . . inner locking collar
500-3 . . . first connector tube
500-4 . . . second connector tube
500-5 . . . locking mechanism
500-6 . . . third connector tube
600 . . . securement plate
700 . . . first fan
710 . . . heat exchanger
720 . . . utility line
730 . . . valve
740 . . . compressor
750 . . . capillary tube
760 . . . flexible tubing
770 . . . connecting head
780 . . . connector
800 . . . motor
810 . . . second fan
1100 . . . fluid connector
1110 . . . first part
1120 . . . collar
1130 . . . wall
1135 . . . fluid channel
1140 . . . catch
1150 . . . lip
1160 . . . collapsible resistance element
1170 . . . plug
1172 . . . first contact surface
1174 . . . second contact surface
1175 . . . stop
1180 . . . second part
1190 . . . wall
1192 . . . first contact surface
1195 . . . fluid channel
2010 . . . plug
2020 . . . second contact surface
2030 . . . collapsible resistance element
2040 . . . rigid resistance element
2050 . . . ring
2060 . . . seal

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

Figure 1:
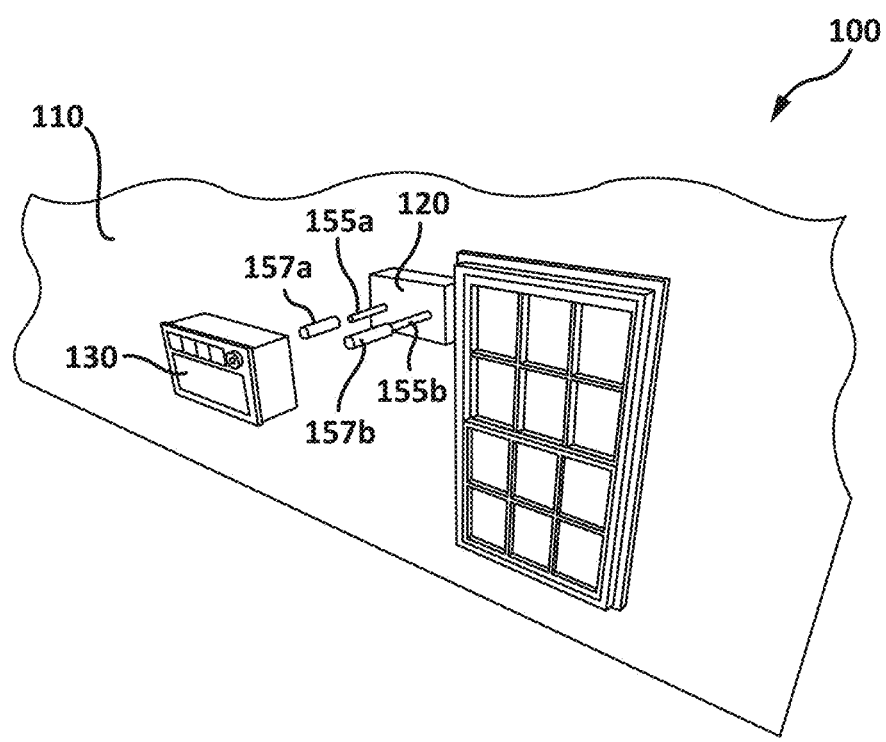
FIG. 1 illustrates a wall-mounted, modular air conditioning system, according to embodiments of the present disclosure.

FIG. 1 illustrates an air conditioning system 100, according to some embodiments of the present disclosure. In this example, the air conditioning system 100 is configured for cooling an inside environment and includes a condenser unit 120 and an evaporator unit 130 mounted on opposite sides of a wall 110. The condenser unit 120 is in fluid communication with the evaporator unit 130 by a refrigerant supply line (not shown) and a refrigerant return line (not shown). The refrigerant (not shown) compressed, using a compressor (not shown), from a first starting pressure to a second higher exit pressure. The compressed refrigerant then enters the condenser unit 120. The condenser unit 120 includes a heat exchanger that transfers heat from the refrigerant to the outside air by condensing the refrigerant within the heat exchanger. The cooled, condensed refrigerant is then directed across a metering valve (not shown) to the evaporator unit 130. The refrigerant undergoes a pressure drop as it passes across the valve, from the second higher pressure produced by the compressor to the lower starting pressure (assuming minimal pressure losses in the rest of the system). The evaporator unit 130 includes a second heat exchanger that transfers heat from a warm, inside air stream (not shown) to the refrigerant (not shown), vaporizing the refrigerant, and cooling the inside air stream, which may then be circulated within the structure to provide cooling. Thus, the condenser unit 120 may have a fan (not shown), and a motor (not shown) for driving the fan, to transport outside air over heat exchanger contained in the condenser unit 120. In addition, the evaporator unit 130 may have another fan (not shown), and another motor (not shown) for driving the evaporator fan, for transporting inside air over the evaporator unit 130. In addition, the compressor (not shown) may also have its own dedicated motor (not shown). Other connected elements may exist between the condenser unit 120 and the evaporator unit 130 including, for example, additional fluid lines (e.g. condensate) and electrical lines. A fluid line may be any conduit suitable for transferring a fluid used in an air conditioning system. Exemplary fluids include liquid water, water vapor, liquid refrigerant, and/or vaporized refrigerant.

Referring again to FIG. 1, regardless of their relative position to the outside and inside environments, a condenser unit 120 and an evaporator unit 130 of the air conditioning system 100 may be physically connected to each other by a pair of connecting elements, a first attachment 155 and a second attachment 157. For example, a first attachment 155 may be physically attached to the condenser unit 120 and/or the housing of the condenser unit 120, in the form of a hollow tube or duct. The first attachment 155 may be attached to the condenser unit housing and/or evaporator unit housing by any suitable means, e.g. by screws, threads, welds, rivets, adhesives, etc. Alternatively, the first attachment 155 may be an integral part of the housing of an condenser unit 120. The first attachment 155 may have a first end that is attached to the condenser unit 120 and a second end that is adjustably inserted into and/or connected to the second attachment 157. For example, the second attachment 157 may be a hollow tube or duct with a larger diameter than the diameter of the first attachment 155, such that the first attachment 155 may be adjustably inserted into the second attachment 157, where "adjustably" refers to the ability to control how much of the first connector's length may be inserted into the second attachment 157. Thus, the first attachment 155 may slide within the second attachment 157, and the first attachment 155 may be reversibly secured at one or more pre-defined locations within the second attachment 157.

A second attachment 157 of an air conditioning system 100 may be inserted into one or more holes (not shown) that have been placed through a wall 110 to provide structural support for the evaporator unit 130 and the condenser unit 120, and/or to assist with positioning, aligning, and/or attaching the evaporator unit 130 and the condenser unit 120 together. For example, a hole may be positioned within a wall 110 such that it passes through the entire width/thickness of the wall 110, such that the hole is positioned substantially perpendicular to the outside surfaces of the wall 110. A second attachment 157 may be positioned within the hole so that the second attachment 157 passes through at least a portion of the wall's thickness. The second attachment 157 may then be secured using a fastener (not shown) so that the second attachment 157 remains at a fixed position within the hole and the wall 110. Thus, a second attachment 157 may act as permanent fixture, attachment and/or guide for positioning the first attachment 155 attached to the condenser unit 120, relative to the wall 110 and the evaporator unit 130.

A second attachment 157 may physically attach to the evaporator unit 130 and/or the housing of the evaporator unit 130 e.g. by adhesives, screws, rivets, threads, welds, etc. In still other examples, the second attachment 157 may be an integral part and/or extension of the evaporator unit 130 and/or the housing of the evaporator unit 130. In other cases, the second attachment 157 may have a first end that is inserted within a hole positioned within a wall 110 and a second end that is attached to the evaporator unit 130 and/or inserted into an interior channel (not shown) positioned within the evaporator unit 130. Thus, a second attachment 157 may have a first end, a second end, and a length connecting the two ends, where a substantial portion of the length is positioned within a hole (not shown) placed through the wall 110. A pair of connecting elements is shown in FIG. 1; first attachments 155*a* and 155*b*, and second attachments 157*a* and 157*b*. This is for illustrative purposes. In some embodiments of the present invention, one or more connecting elements or connecting systems may be utilized to position and/or connect a condenser unit and an evaporator unit relative to each other and relative to a supporting wall.

The example described above for FIG. 1 describes a cooling scenario, where heat is transferred from an inside environment, by vaporizing refrigerant in an evaporator unit 130 positioned inside, to an outside environment, by condensing the refrigerant in a condenser unit 120 positioned outside. However, in some embodiments, the air conditioning system 100 shown in FIG. 1 can be operated as a heating system by operating the system in "reverse". For example, heat may be transferred from the outside environment to the inside environment by positioning the evaporator unit 130 outside and the condenser unit 120 inside. For this configuration, heat is transferred from the outside air by evaporation of the refrigerant in the evaporator unit 130, with this heat then transferred to the inside environment by condensing the refrigerant in the condenser unit 120. However, because the condenser in the condenser unit 120 is an air-cooled heat-exchanger, and the evaporator in an evaporator unit 130 is an air-heated heat-exchanger, an air conditioning system may be configured to operate in either a heating mode or a cooling mode, where the system may be reversibly switched between the two modes by changing the direction of flow of the refrigerant in the air conditioning system (e.g. by reversing the flow direction of the pump circulating the refrigerant, and/or suitable use of valves and piping).

Thus, referring again to FIG. 1, the relative positions of the condenser unit 120 and the evaporator unit 130 are shown for illustrative purposes. In other cases, the relative positions of the condenser unit 120 and the evaporator unit 130 may be reversed. The choice of relative positions of the condenser unit 120 and the evaporator unit 130 will depend on the application. For the remainder of the figures in the present disclosure, the more general terms "first unit" and "second unit" will be used, where both the first unit and the second unit will contain the mechanical elements needed to heat and/or cool; e.g. a heat exchanger, a compressor, a motor, a fan, piping, and/or valving, etc. Thus, in some embodiments, a first unit may be a condenser unit and a second unit may be an evaporator unit. In some embodiments, a first unit may be an evaporator unit and a second unit may be a condenser unit. In some embodiments of the present disclosure, an air conditioning system may provide between about 4,000 BTU/hr and about 18,000 BTU/hr of heating and/or cooling capacity.

Figure 2:
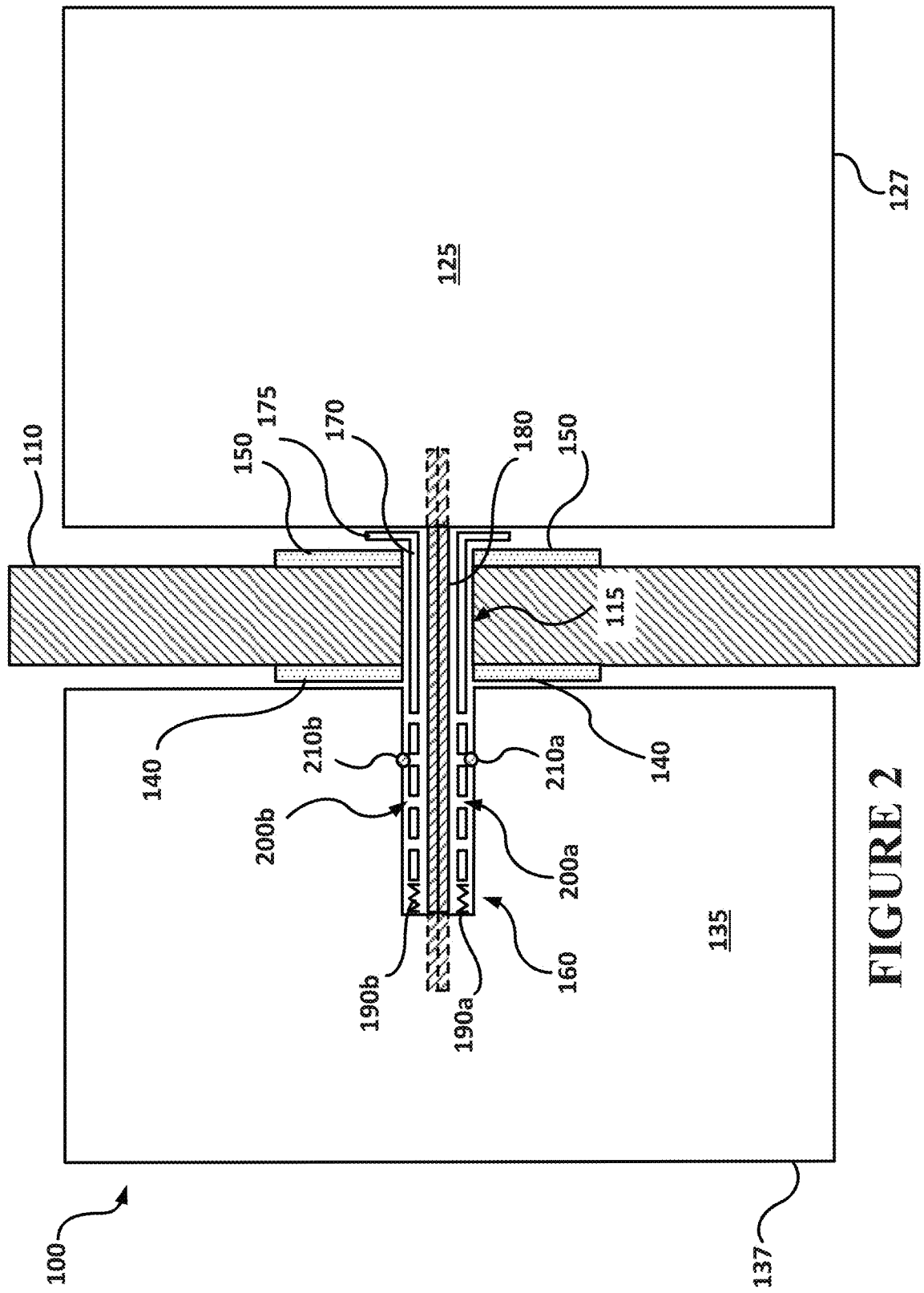
FIG. 2 illustrates a cross-sectional view of a wall-mounted, modular air conditioning system, according to embodiments of the present disclosure.

FIG. 2 illustrates a cross-sectional view of an air conditioning system 100. This exemplary air conditioning system 100 has a second unit 135 positioned on a first side of a wall 110, and a first unit 125 positioned on a second side of the wall 110. FIG. 2 illustrates an exemplary system/method for positioning, aligning, and/or connecting the second unit 135 and the first unit 125 to each other and to the supporting wall 110. In this example, a sleeve 170 is connected to the first unit 125. The sleeve 170 may be screwed, welded, riveted, and/or adhered to the first unit 125 and/or a housing of the first unit 125. The sleeve 170 may be a hollow tube, nested and/or telescoping tubes, a hollow pipe, nested and/or telescoping pipes, and/or any other suitable hollow structure having an interior passage. The sleeve 170 may also include a flange 175 to enable easier attachment of the sleeve 170 to the first unit 125. A flange 175 may have one or more holes passing through it to enable the use of screws or other suitable attaching mechanisms, for attaching the sleeve 170 to the first unit 125. Alternatively, a sleeve may be an integral component of the second unit 135.

The sleeve 170 may be positioned in a substantially concentric configuration around one or more shared, connected elements utilized by both the first unit 125 and the first second 135. As shown in FIG. 2, one such connected element may be a drive mechanism 180, which may be positioned within the internal passage of the sleeve 170. The drive mechanism 180 may connect, for example, two fans (not shown), one each used by the second unit 135 and the first unit 125, thus enabling one motor (not shown) to be used for both fans and eliminating a motor from the air conditioning system 100. Other shared, connected elements that may pass through the hollow interior passage of a sleeve 170 may include fluid lines, electrical lines, and/or any other utility lines and/or mechanical connections required by a particular air conditioning system (see FIG. 4). Referring again to FIG. 2, a first end of the drive mechanism 180 may be physically attached to the first unit 125, and a second end of the drive mechanism 180 may be physically attached to the second unit 135. A first end of the drive mechanism 180 may be physically attached to a motor (not shown) positioned within the first unit 125, where the motor powers the drive mechanism 180 and a fan (not shown) positioned within the first unit 125. The sleeve 170 may then be positioned over the drive mechanism 180 and attached, e.g. using the flange 175, attached to the first unit 125 (e.g. the first unit housing). Once the sleeve 170 is attached to the first unit 125, the sleeve 170 and the drive mechanism 180 may be passed through a hole 115 positioned in the wall 110 so that the second unit 135 may be physically connected to the first unit 125.

FIG. 2 shows a second unit 135 with a channel 160 built into the second unit 135, where the channel 160 may be configured to receive a portion of the sleeve 170. Thus, the sleeve 170, connected to the first unit 125, may be inserted into the channel 160 of the second unit 135 to physically attach the second unit 135 to the first unit 125. As described above, the drive mechanism 180 may have a first end that is physically connected to a motor (not shown) built into the first unit 125, e.g. to drive (e.g. rotate) a first fan (not shown) located in the first unit 125. A second end of the drive mechanism 180 may then be inserted into a receiver (not shown) positioned at the end of the channel 160 of the second unit 135, resulting in the mechanical coupling of the motor (not shown) contained in the first unit 125 to the second unit 135. Thus, the drive mechanism 180 may also drive (e.g. rotate) a mechanical element positioned in the second unit 135, e.g. a second fan (not shown), in addition to the first fan (not shown) positioned within the first unit 125. Alternatively, a first unit 125 may be configured with a channel 160 to receive a sleeve 170 connected to a second unit 135.

A system for physically aligning and/or connecting the sleeve 170 of a first unit 125 within a channel 160 of a second unit 135 may include a number of additional elements. For example, a sleeve 170 may have one or more receiving holes (200a and 200b) positioned at predefined spacing along the length of the sleeve 170. The receiving holes (200a and 200b) may be positioned to receive one or more arrest mechanisms (210a and 210b), which may be attached to the inside walls of the channel 160 of the second unit 135. Thus, as the sleeve 170 is inserted into the channel 160, the arrest mechanisms (210a and 210b) may reversibly move in and out of the receiving holes (200a and 200b), in the radial direction relative to the sleeve 170. When the arrest mechanisms (210a and 210b) are aligned with the receiving holes (200a and 200b), they may move radially inward to occupy at least a portion of the receiving holes (200a and 200b) and provide friction to help maintain the sleeve's position within the channel 160 (along the long-axis of the sleeve 170, the longitudinal axis). The application of additional force, along the longitudinal axis, may cause the one or more arrest mechanisms (210a and 210b) to move back out of the receiving holes (200a and 200b), radially outward, allowing the sleeve 170 to move either further into the channel 160 (bringing the second unit 135 and the first unit 125 closer together), or out of the channel 160 (moving the second unit 135 and the first unit 125 farther apart). In some examples, the arrest mechanisms (210a and 210b) may require a radial force, for example a pinching force, to move the arrest mechanisms (210a and 210b) out of contact with the receiving holes (200a and 200b), such that the simultaneous application of a longitudinal force (relative to the sleeve 170) will move the second unit 135 towards or away from the first unit 125.

The arrest mechanisms (210a and 210b) and the corresponding receiving holes (200a and 200b) are examples of elements that provide a way to lock a second unit in a desired position relative to a first unit. Any other suitable element may be used as an alternative to the previously described the arrest mechanisms (210a and 210b) and the corresponding receiving holes (200a and 200b) and are considered within the scope of the present disclosure. Some alternative elements for locking the second unit into position include friction fittings, threaded connections, pin mechanisms, and/or ratcheting mechanisms, where one or more of these features are placed as needed along the length of a sleeve and/or within a channel.

Thus, in some embodiments of the present invention, a sleeve 170 may be configured to have a plurality of groups of receiving holes, with each group positioned circumferentially around the diameter of the sleeve 170. Each receiving hole 200, of each group of receiving holes, may be positioned around the circumference of the sleeve 170 at substantially the same distance from either end of the sleeve 170 (e.g. the flange 175 and/or the end positioned within the channel 160). In other embodiments, the receiving holes may be placed at varying distances from the end of the sleeve 170. The receiving holes 200 may pass entirely through the walls of the sleeve 170, and/or the receiving holes 200 may pass only partially through the walls, resulting in depressions or divots, instead of holes on the outside surfaces of the sleeve 170. Alternatively, instead of a plurality of groups of receiving holes 200 positioned around the outer circumference of a sleeve 170, a sleeve 170 may have a plurality of grooves and/or indents that are placed around the outside surface of the sleeve 170 and around substantially all of the outer circumference of the sleeve 170. In this embodiment, one or more arrest mechanisms 210 may move reversibly in and out of the grooves and/or indents to guide the sleeve 170 into predefined positions within the channel 160. Grooves and/or indents may provide the advantage (over holes) of not requiring that the arrest mechanisms 210 be perfectly positioned around the outer circumference of the sleeve 170, to lock in place (e.g. there will be no need to rotate the sleeve 170 around the longitudinal axis).

One or more springs (190a and 190b) may also be positioned within the channel 160, for example, to help minimize movement of the sleeve 170 within the channel 160, once the desired position of the first unit 125 relative to the second unit 135 is attained, e.g. along the longitudinal axis of the sleeve 170. Unwanted movement of the installed air conditioning system 100 may also be minimized by the placement of gaskets between opposing surfaces of the wall 110 and the first unit 125 and/or the second unit 135. Gaskets may also provide a better barrier between the inside environment and the outside environment by providing better air and/or moisture seal. For example, a first gasket 140 may be placed between the second unit 135 and a first outer surface of the wall 110, and/or a second gasket 150 may be placed between the first unit 125 and a second outer surface of the wall 110. Such gaskets (140 and 150) may provide an elastic force that helps minimize unwanted movement of the first unit 125 and/or the second unit 135, relative to each other and to the wall 110, once the air conditioning system 100 is fully installed. In addition, such gaskets (140 and 150) may also provide insulating value be obstructing portions of the channel 160 not occupied by the sleeve 170; e.g. prevent air flow through the hole 115.

FIG. 2 illustrates a sleeve 170 in the form of a hollow conduit (e.g. a pipe, duct, etc.) through which one or more of a fluid line, an electrical line, and/or a drive mechanism may pass. In some embodiments, a sleeve may be constructed from one or substantially solid projections. Such a solid projection may extend in a longitudinal direction for a defined length and may have a circular, square, rectangular, triangular, and/or any other suitable cross-sectional shape. Thus, a solid sleeve may provide the mechanical support needed to move the first unit into place, while also providing the mechanism for attaching the first unit to the wall and for attaching the second unit to the first unit. The one or more fluid line, electrical line, drive mechanism, and/or any associated connectors may be attached to or loosely connected to an external surface of the solid sleeve to facilitate insertion of these elements through the wall to be attached to the corresponding connectors of the second unit.

The sleeve 170 illustrated in FIG. 2 shows an embodiment of the present disclosure, where the sleeve 170 is attached to an external surface a housing 127 of the first unit 125. However, a sleeve need not be attached to an external surface of a housing of the first unit. In some embodiments, a first end of the sleeve may be inserted into a cavity, hole, receptacle, and/or receiver positioned within the housing of a first unit. The first end of the sleeve may be secured in place by the use of one or more welds, screws, and/or any other suitable attachment means. The second end of the sleeve may then be inserted into the channel of the second unit, as shown in FIG. 2.

Figure 3:
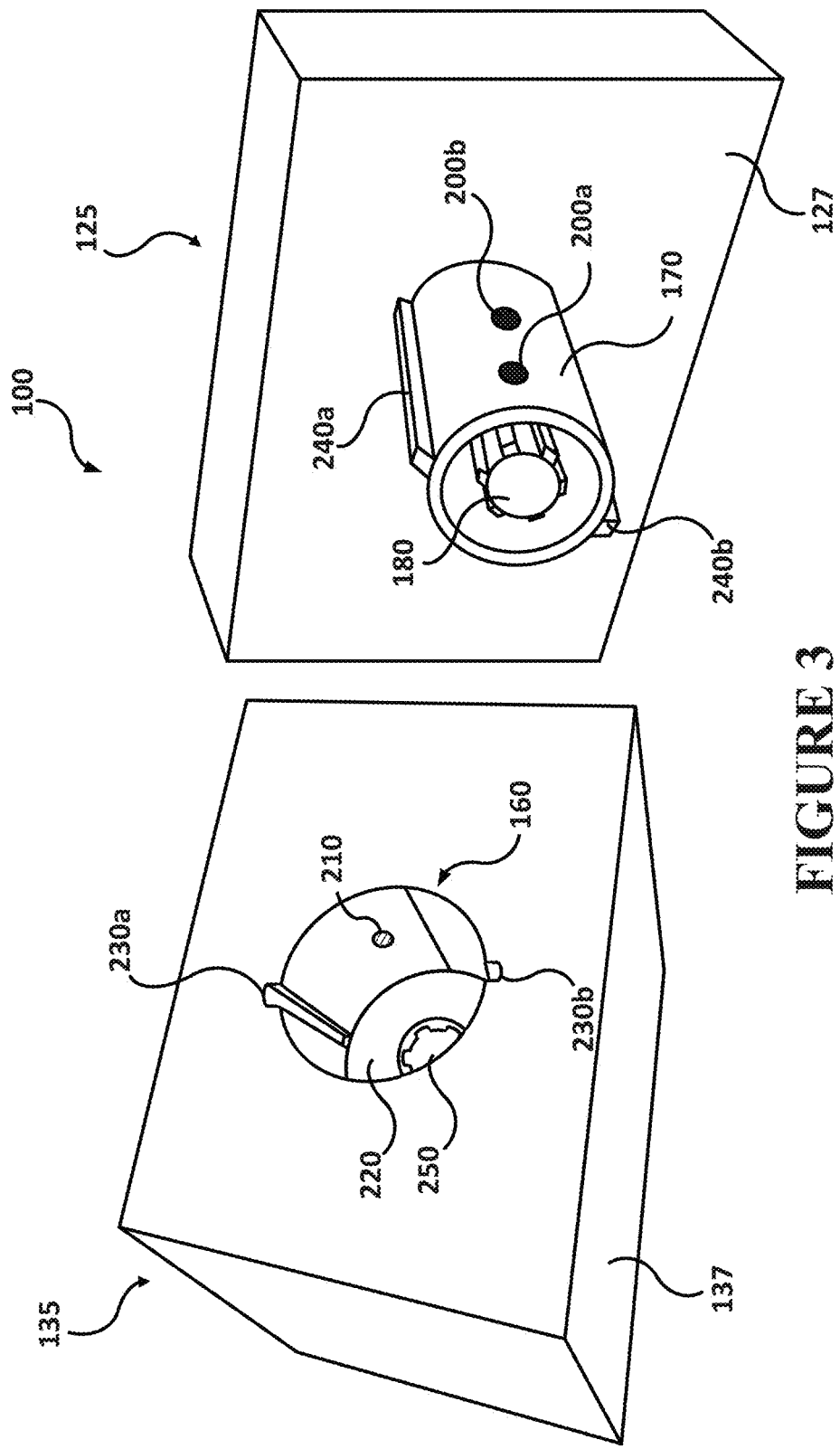
FIG. 3 illustrates a perspective view of a wall-mounted, modular air conditioning system, according to embodiments of the present disclosure.

FIG. 3 provides a perspective view of an exemplary air conditioning system 100. This air conditioning system 100 provides a separate second unit 135 and first unit 125, positioned on opposite sides of a supporting wall (not shown). The first unit 125 has a sleeve 170 positioned substantially perpendicular to an outside surface of the first unit 125. The sleeve 170 is positioned substantially concentrically around a drive mechanism 180. The drive mechanism 180 may be attached to a motor (not shown) that drives (e.g. rotates) another mechanical component of the first unit 125, for example a fan (not shown). The sleeve 170 of the first unit 125 may be configured to reversibly move into a channel 160 positioned within the second unit 135. The channel 160 may have one or more guiding grooves (230a and 230b) aligned along the longitudinal axis of the channel 160, where the guiding grooves (230a and 230b) are positioned to receive guiding edges (240a and 240b) positioned on the outside surface and along the longitudinal axis of the sleeve 170. In some embodiments, more than one sleeve 170 may be utilized, with each sleeve 170 passing through its own dedicated hole 115 placed in the wall 110, and physically inserting into its own dedicated channel 160 positioned within the second unit 135.

Thus, reversibly moving the sleeve 170 into the channel 160 requires that the sleeve 170 have an outer diameter that is smaller than the inner diameter of the channel 160. Further, the positions of the guiding grooves (230a and 230b) around the circumference of the channel 160 may need to substantially match the positions of the guiding edges (240a and 240b) around the circumference of the sleeve 170 so that each guiding edge (240a and 240b) may slide into its respective guiding groove (230a and 230b). FIG. 3 shows a plurality of receiving holes (200a and 200b) penetrating the wall of the sleeve 170. The receiving holes (200a and 200b) may be positioned and aligned with at least one arrest mechanism 210 built into the channel 160 of the second unit 135. Thus, the angular position, around the longitudinal axis of the channel 160 and the sleeve 170, of the guiding grooves (230a and 230b), the guiding edges (240a and 240b), the receiving holes (200a and 200b), and the arrest mechanism 210, may all be positioned to enable the sleeve 170 to move reversibly in and out of the channel 160 at the orientation needed for the arrest mechanism 210 to move reversibly in and out of the receiving holes (200a and 200b). In addition, the angular position around the longitudinal axis of the channel 160 and the sleeve 170, of the guiding grooves (230a and 230b), the guiding edges (240a and 240b), the receiving holes (200a and 200b), and the arrest mechanism 210, may all be positioned to align and attach shared, connected elements, e.g. drive mechanism 180. So, for the example of FIG. 3, physically joining the second unit 135 with the first unit 125 may begin with aligning the guiding edges (240a and 240b) of the sleeve 170 of the first unit 125, with the guiding grooves (230a and 230b) of the channel 160 of the second unit 135, and aligning the longitudinal axis of the channel 160 with the longitudinal axis of the sleeve 170. Installation may then be completed by applying a force to the first unit 125 in a direction along the longitudinal axes of the sleeve 170 and the channel 160 to move the sleeve 170 into the channel 160. As the sleeve 170 moves farther into the channel 160, the arrest mechanisms 210 may physically engage the receiving holes 200, to help control the movement of the sleeve 170 into the channel 160. At a predefined insertion depth, the exposed end of the drive mechanism 180 may contact a drive receiver 250 positioned at the end of the channel 160. The end of the channel 160 within the second unit 135 is referred to herein as a face plate 220. The orientation of the drive mechanism 180 relative to the drive receiver 250 positioned within the face plate 220, and the insertion of the exposed end of the drive mechanism 180 into the drive receiver 250 may be controlled by a splined-configuration, as shown in FIG. 3. Other guide mechanisms may be included as needed to rotate the drive mechanism 180 around its longitudinal axis, to allow the opposing splined-connections to properly mate together. In some embodiments, the sleeve 170, the channel 160, and/or the face plate 220 may include a latching mechanism (not shown) to maintain the final longitudinal position of the first unit 125 relative the second unit 135.

FIGS. 2 and 3 illustrate an exemplary embodiment where a face plate is positioned within an interior volume defined by the housing 137 of the second unit. Alternatively, a face plate for interfacing and connecting with a corresponding connecting head may be positioned at the distal end of a second sleeve, where the second sleeve has a proximal end that is physically attached to the housing of the second unit. Thus, in some embodiments, instead of positioning a channel within the second unit, a channel may be placed within a portion of a second sleeve that extends from the housing of the second unit. The second sleeve may have a wall that defines an internal cavity, which contains one or more of a fluid line, an electrical line, and/or a drive mechanism. Thus, an exemplary air conditioning system may be installed by aligning the first sleeve of the first unit with the second sleeve of the second unit, along a longitudinal axis, and then inserting the distal end of the first sleeve into the channel positioned within the distal end of the second sleeve. Insertion results in locking the second unit in place, relative to the first unit along the longitudinal axis, and completes at least one of a fluid connection, electrical connection, and/or mechanical connection between the first unit and the second unit.

Figure 4:
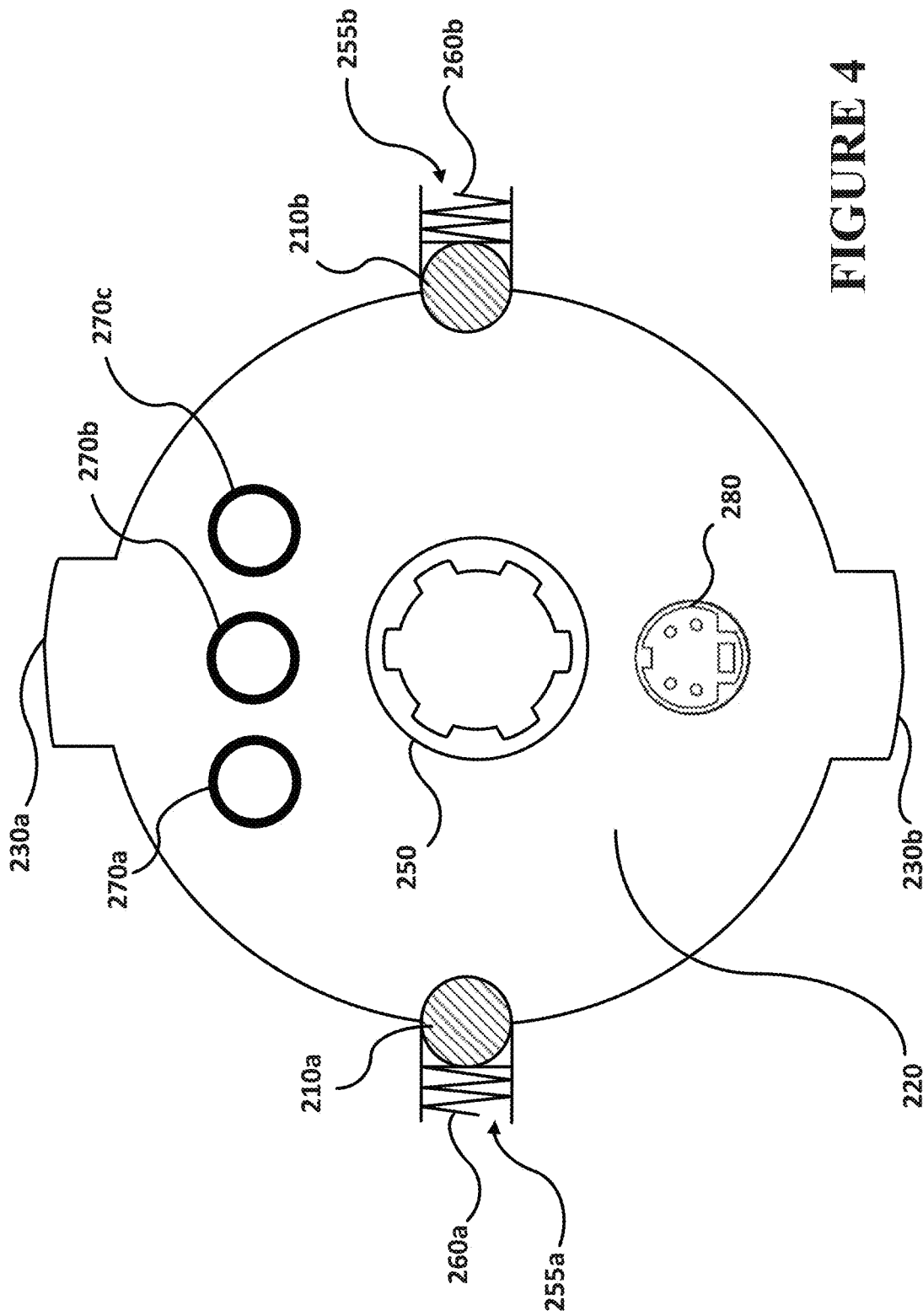
FIG. 4 illustrates a cross-sectional view of a face plate for attaching shared connected elements of a modular air conditioning system, according to embodiments of the present disclosure.

FIG. 4 illustrates an exemplary face plate 220, positioned for example within a channel (not shown) of a second unit (not shown). FIG. 4 shows a cross-sectional view of the channel's inside surfaces, which may include guide grooves (230a and 230b) and arrest mechanisms (210a and 210b) positioned within corresponding arrest tracks (255a and 255b). Thus, the arrest mechanisms (210a and 210b) may reversible move in the radial direction. Movement of the sleeve (not shown) within the channel may force the arrest mechanisms (210a and 210b) radially away from the longitudinal axis of the channel and into their respective arrest tracks (225a and 225b). As a result the arrest mechanisms (210a and 210b) may compress swings (260a and 260b) positioned within the arrest tracks (255a and 255b). When the sleeve is positioned such that its receiving holes (not shown) are aligned with a corresponding arrest mechanism (210a and 210b), the springs (260a and 260b) may force the arrest mechanisms (210a and 210b) towards the longitudinal axis of the channel and into adjacent receiving holes positioned in the sleeve.

The exemplary face plate 220 of FIG. 4 includes a drive receiver 250 configured to receive a drive mechanism (not shown). In addition, this exemplary face plate 220 includes three fluid connectors (270a, 270b, and 270c) and one electrical connector 280, to connect shared connected elements, such as refrigeration lines, condensate lines, and/or power lines. Other embodiments may include one or more fluid connectors and/or one or more electrical connectors. In general, every connector configured on the face plate 220 of the channel of a second unit will have a corresponding connector configured within the sleeve (not shown) of the first unit (not shown) of the air conditioning system. For example, each connector placed in the face plate of a channel of a second unit may include a reversibly sealable hole configured to receive an insertable, mating connector associated with the sleeve of a first unit. Thus, movement of the sleeve into the channel, where the alignment of the sleeve within the channel is guided by alignment mechanisms, e.g. guide grooves (230a and 230b) and guide edges (not shown), may facilitate the simultaneous alignment and attachment of each pair of connectors, for each shared connected element.

To summarize for the example of FIG. 4, insertion of the sleeve (not shown) into the channel may result in the simultaneous attachment of a first fluid connector 270a with a first mating connector (not shown) configured within the sleeve, where the attachment of the two connectors allows the transfer of a first fluid (e.g. liquid refrigerant) between the second unit and the first unit. Simultaneously, insertion of the sleeve (not shown) into the channel may result in the simultaneous attachment of a second fluid connector 270b with a second mating connector (not shown) configured within the sleeve, where the attachment of these two connectors allows the transfer of a second fluid (e.g. vaporized refrigerant) between the second unit and the first unit. Simultaneously, insertion of the sleeve into the channel may result in the simultaneous attachment of a third fluid connector 270c with a third mating connector (not shown) configured within the sleeve, where the attachment of these two connectors allows the transfer of a third fluid (e.g. water condensate) between the second unit and the first unit. Simultaneously, insertion of the sleeve into the channel may result in the simultaneous attachment of the electrical connector 280 with a mating electrical connector (not shown) configured within the sleeve, where the attachment of these two connectors allows the transfer of electrical power and/or signals between the second unit and the first unit.

Figure 5A:
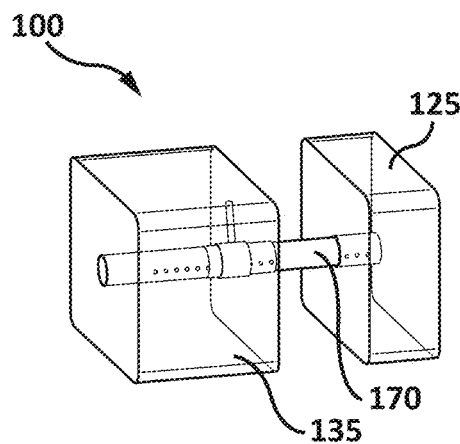
FIGS. 5a and 5b illustrate perspective views of a modular air conditioning system, according to embodiments of the present disclosure.
Figure 5B:
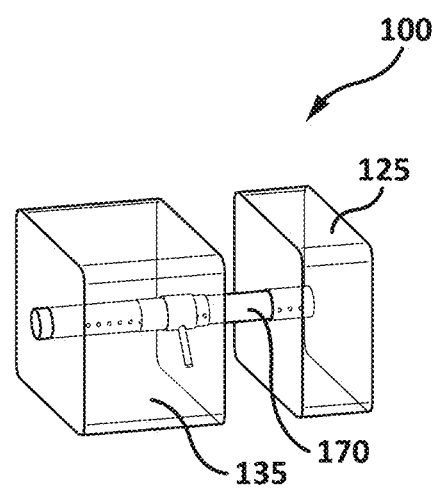
Figure 5C:
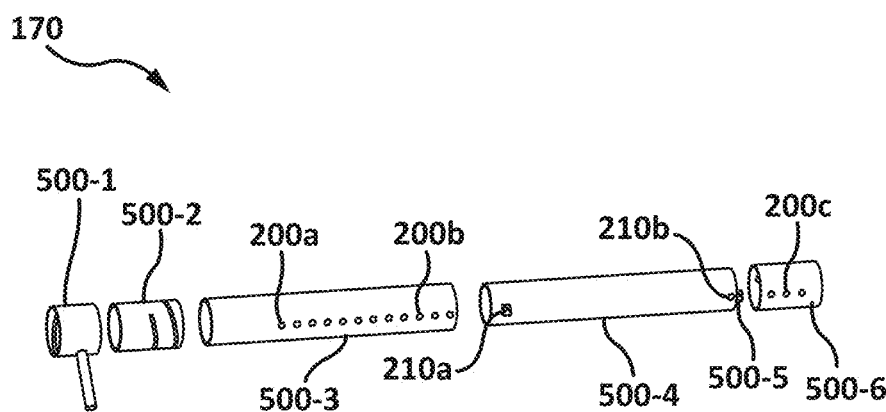
FIG. 5c illustrates a connecting mechanism for attaching condenser first unit and a second unit of a modular air conditioning system, according to embodiments of the present disclosure.

FIGS. 5a-c illustrate another embodiment of an air conditioning system 100. This exemplary air conditioning system 100 has a separate first unit 125 and a separate second unit 135, where the second unit 135 and the first unit 125 are connected by a sleeve 170. The sleeve 170 may include two or more telescoping tubes. The exemplary sleeve 170 of FIG. 5c includes three; a first connector tube 500-3, a second connector tube 500-4, and a third connector tube 500-6, where each tube has pin settings adjusted for the wall thickness of the wall (not shown) to which the air conditioning system 100 is being installed. For example each tube (500-3, 500-4, and 500-6) may have markings on the outside surfaces of the tubes that provided installation guides for varying wall thicknesses. A sleeve 170 may also include a locking mechanism 500-5 to set the relative position of the second connector tube 500-4 to the third connector tube 500-6.

The first connector tube 500-3 may be physically attached to an outside surface of either the first unit 125 or the second unit 135 and the third connector tube 500-6 may be positioned within the remaining unit (either the first unit 125 or the second unit 135), such that when a force is applied along the longitudinal axis direction of the tubes, the third connector tube 500-6 and the unit it is connected to (either the first unit 125 or the second unit 135) may be pulled along the longitudinal axis. As described above, a simultaneous radial force may need to be applied to an arrest mechanism 2110a positioned within the second tube connector 500-4 to temporarily remove the arrest mechanism 210 from one or more receiving holes (200a and 200b) positioned within the first connector tube 500-3. The second connector tube 500-4 may be connected to the first connector tube 500-3 and the third connector tube 500-6 prior to installation, to attain the spacing needed between the second unit 135 and the first unit 125, for a particular wall thickness. Then, either the first connector tube 500-3 and/or the third connector tube 500-6 may be collapsed and/or telescoped with the other tubes to tightly position the second unit 135 and the first unit 125 in place around the wall (not shown). The third connector tube 500-6 may also have one or more receiver holes 200c positioned along its longitudinal axis, such that a corresponding arrest mechanism 210b positioned at an end of the second connector tube 500-4 may reversibly lock the third connector tube 500-6 into a desired position with the second connector tube 500-4.

In some embodiments, the first installed tube, either the first connector tube 500-3 or the third connector tube 500-6, may have a friction mechanism, for example ribs, positioned on their exterior surfaces to create a friction connection between that tube and the inside surfaces of the hole penetrating the wall. Such a friction connection may prevent the first installed tube from being pushed out of the wall, when the other remaining tubes (either the first connector tube 500-3 or the third connector tube 500-6) are connected to the first installed tube.

Figure 5D:
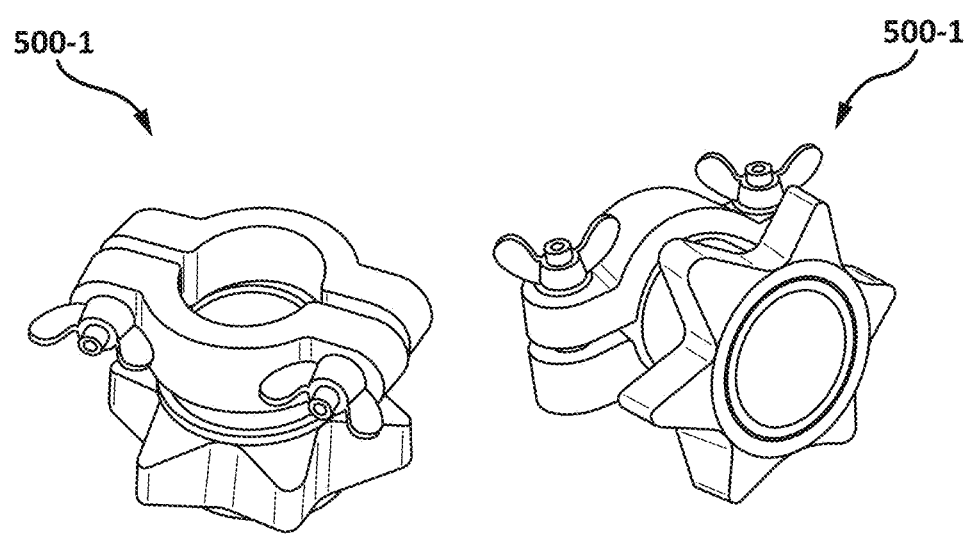
FIG. 5d illustrates an outer locking collar for a connecting mechanism, according to embodiments of the present disclosure.

Referring again to FIGS. 5a and 5b, the elements of the sleeve 170 may telescope into each other as the first unit 125 and the second unit 135 are moved closer to one another (FIG. 5b shows the first unit 125 positioned closer to the second unit 135, along the longitudinal axis). Once the second installed tube (either the first connector tube 500-3 or the third connector tube 500-6) is secured to the first installed tube, for example, with the assistance of an outer locking collar 500-1, a solid, immobile installation of the air conditioning system 100 to its mounting wall, may be achieved. In some cases, an inner locking collar 500-2 may be rigidly attached to the first connector tube 500-3. Alternatively, an inner locking collar 500-2 may slide over the first connector tube 500-3 and lock into place using spring pin holes positioned within the first connector tube 500-3. In either case, once the inner locking collar 500-2 is in the desired position, the outer locking collar 500-1 may be moved (e.g. by spinning it around guiding threads—not shown), causing mechanical advantage to push against the body of either the first connector tube 500-3 or the third connector tube 500-6 to pull all of the components of the sleeve 170 further into the body of the tube having the inner locking collar 500-2 positioned within it. In this way, the sleeve 170 may pull together the two tubes, the first connector tube 500-3 and the third connector tube 500-6, and tighten them against the wall. Friction may then help support the entire sleeve 170 and the air conditioning system 100 on the wall. The locking collars (500-1 and 500-2) may lock in place using a camming action or other positive stop shape and/or mechanism such that when the desired tension is reached, the locking collars may lock in place rather than loosening after the installer stops tightening the device. An example of an outer locking collar 500-1 is shown in FIG. 5d. In some embodiments of the present disclosure, a sleeve may comprise from 2 to 10 telescoping connector tubes. In some embodiments of the present disclosure, a sleeve may comprise from 2 to 10 telescoping connector tubes. In some embodiments, a sleeve may have a length between about 3 inches and about 12 inches. In some embodiments, a connector tube may have a length between about 3 inches and about 12 inches. In some embodiments, connector tubes may be connected to each other using threaded couplings to attach adjacent ends of the connector tubes. In some embodiments, telescoping and/or connected connector tubes may utilize gaskets and/or o-rings to facilitate creating compression and/or friction to lock the connector tubes into a desired orientation and/or length.

Figure 6A:
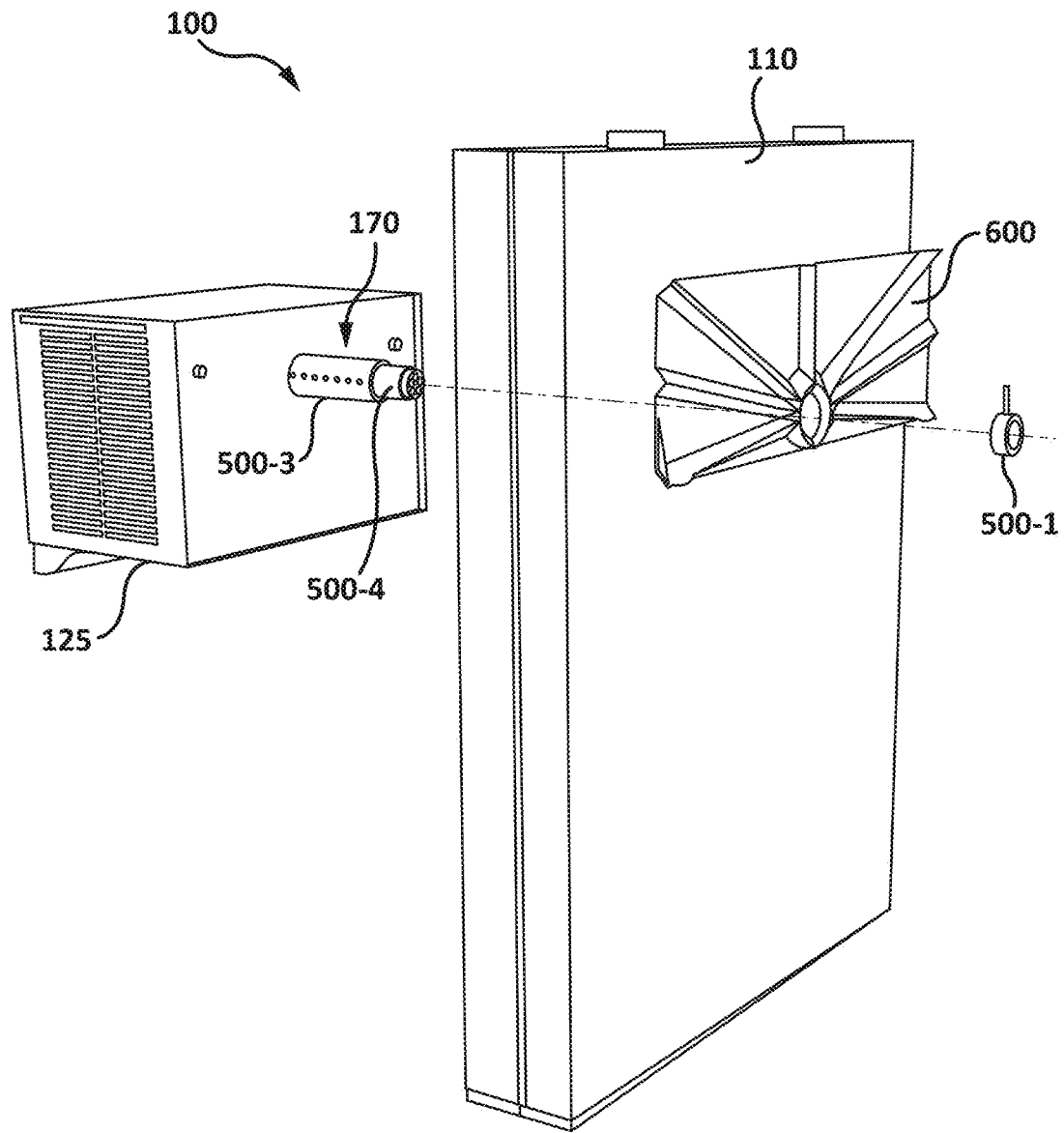
FIGS. 6a and 6b illustrate elements of a modular air conditioning system for simple, cost- and time-efficient installation onto a wall, according to embodiments of the present disclosure.
Figure 6B:
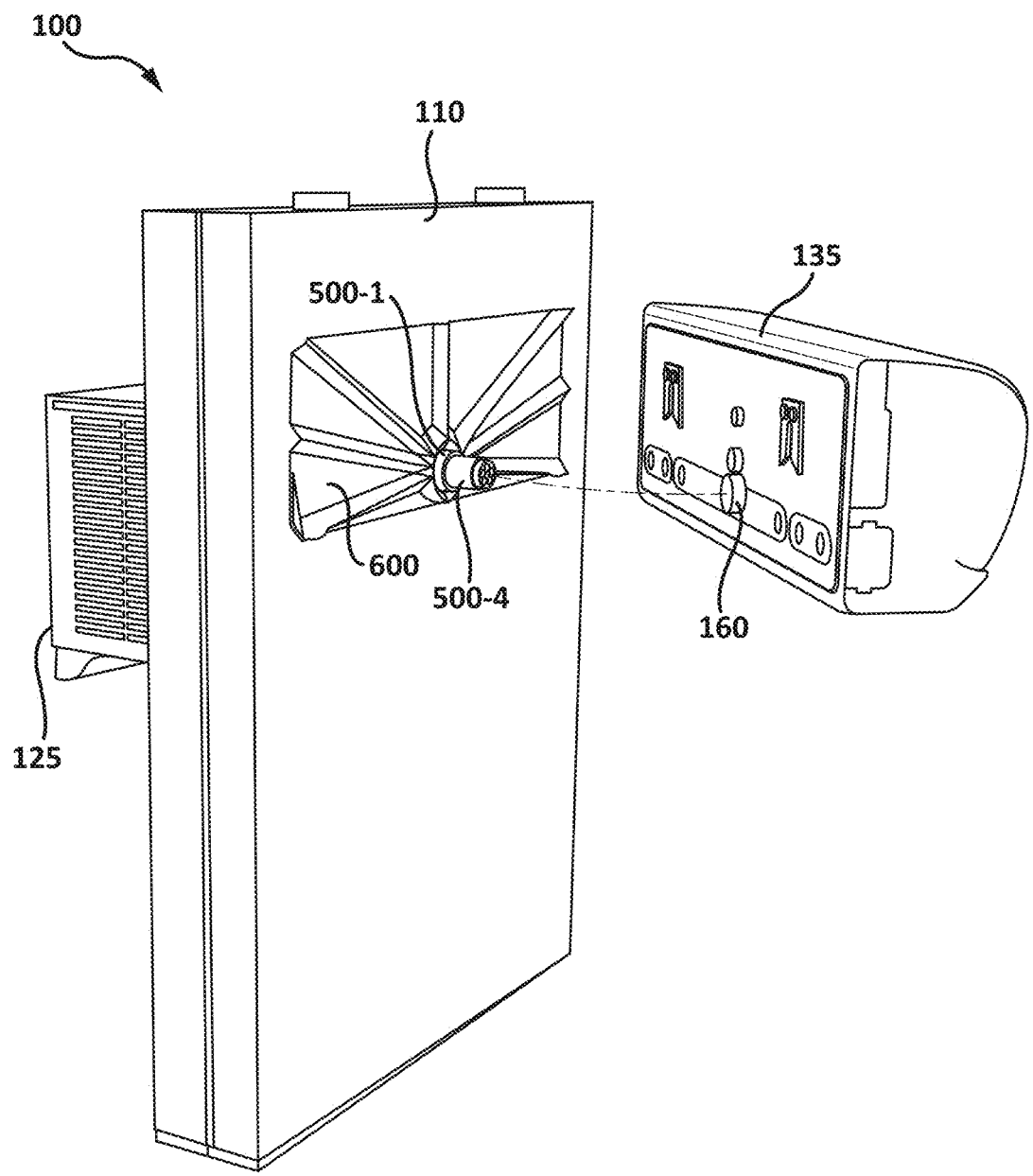

FIGS. 6a and 6b illustrate elements of a modular air conditioning system 100 and how they may be used to install the air conditioning system 100 on an external wall 110 of a building (not shown). For example, a first unit 125 may have a sleeve 170 extending from a housing of the first unit 125. The sleeve 170 may include a telescoping second connector tube 500-4 that is reversibly and/or movably extendable from the inside portion of a first connector tube 500-3. The sleeve 170 may be inserted through a hole (not shown) that has been created in the wall 110, such that the sleeve 170 may be inserted completely through the wall 110, from the exterior surface of the wall 110 to protrude from the interior surface of the wall 110. Thus, the first unit 125 may be physically supported by the insertion of the sleeve 170 through the hole in the wall 110. In addition, a securement plate 600 may be physically attached/secured to the interior surface of the wall 110. The securement plate 600 may have a hole positioned within the securement plate 600 that may be aligned with the hole in the wall, such that the distal end of the sleeve 170 may pass through the hole of the securement plate 600. Once the distal end of the sleeve 170 is positioned as desired, and the housing of the first unit 125 is positioned against a surface of the wall 110, the first unit 125 may be secured in place by the use of an outer locking collar 500-1 that fits around the outer circumference of the at least one of the first connector tube 500-3 and/or the second connector tube 500-4. An outer locking collar 500-1 may include a fitting (e.g. threads, ratchet, quick disconnect, etc.) that enables the outer locking collar 500-1 to move the securement plate 600 into close proximity with the wall 110, thereby compressing the wall 110 between the housing of the first unit 125 and the securement plate 600. Finally, once the first unit 125 has been secured to the wall 110, by the insertion of the sleeve 170 through the wall 110, through the securement plate 600, and by the movement of the outer locking collar 500-1 around the distal end of the sleeve 170, the second unit 135 may be secured to the air conditioning system 100 by insertion of the distal end of the sleeve 170 into a channel 160 positioned in the second unit 135.

Figure 7:
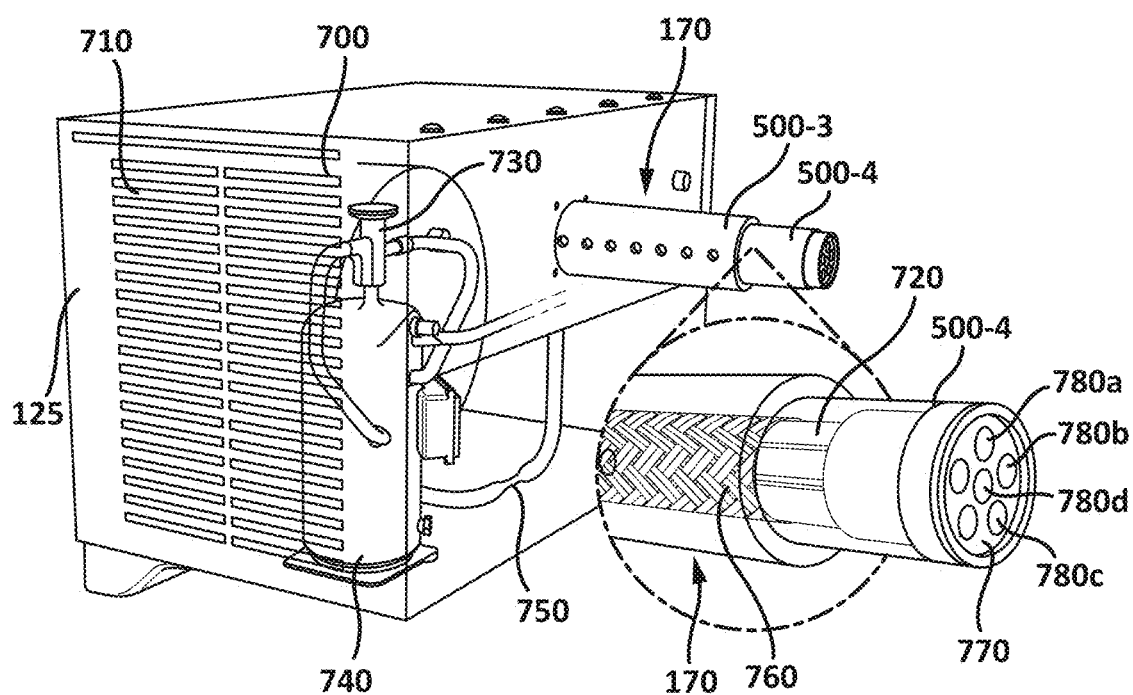
FIG. 7 illustrates features of a first unit of a modular air conditioning system, according to embodiments of the present invention.

FIG. 7 illustrates some of the elements of an exemplary first unit 125, including a sleeve 170, and a first connector tube 500-3 and a second connector tube 500-4 of the sleeve 170, similar to those described above. As shown in FIG. 7, a first unit 125 may have a sleeve 170 that extends from a portion of the housing of the first unit 125. In addition, a first unit 125 may contain a number of mechanical features within the unit's housing, including a fan motor (not shown), a first fan 700, a heat exchanger 710, a compressor 740, a reversing valve 730 (so the unit can provide heating as well and cooling), and at least one refrigerant expansion device such as a capillary tube, fixed orifice, thermostatic expansion valve (TXV) and/or electronic expansion valve (EXV). Refrigerant is compressed to increase temperature, which then flows through a heat exchanger to reject heat. After the heat exchanger, the refrigerant passes through an expansion device (e.g. a valve) to decrease temperature, after which the refrigerant then flows into an evaporator. Utility lines 720, (e.g. fluid lines, refrigerant lines, condensate lines, and/or electrical lines) may be bundled together and positioned within the internal volume of the sleeve 170. In some embodiments, the utility lines 720 may be positioned within flexible tubing 760, which may then be positioned within the internal volume of the sleeve 170. FIG. 7 also illustrates that the sleeve 170 may achieve the same mechanical functionality as the sleeve 170 illustrated in FIG. 2, such that the sleeve 170 may extend from the housing of the first unit 125 and may be inserted into a receiving channel 160 (see FIG. 2) positioned within the second unit 135. Thus, the sleeve 170, in the form of a sleeve 170, may provide the physical pathway for the utility lines 720, so that the first unit 125 and the second unit 135 may be in fluid connection, mechanical connection, and/or electrical connection with each other. FIG. 7 also illustrates that the sleeve 170 may terminate with a connecting head 770 that includes one or more connectors (780a-780d), for example, connectors for transporting fluids and/or electricity. Thus, the connecting head 770 illustrated in FIG. 7 may align with and mechanically engage a corresponding face plate positioned within a channel in the second unit 135 (see reference numbers 160 and 220 of FIGS. 3 and 4).

FIG. 7 illustrates a connecting head 770 positioned at the distal end of a sleeve 170 of a first unit 125 and FIG. 4 illustrates a corresponding face plate 220 positioned within the channel 160 positioned within a second unit 135. These elements are provided in some cases to facilitate positioning and alignment of the first parts of connectors (e.g. fluid, electrical, mechanical) of the first unit with the corresponding second parts of the connectors (e.g. fluid, electrical, mechanical) of the second unit, such that insertion of the sleeve 170 into the channel 160 automatically positions and aligns the first parts and the second parts, and locking the sleeve 170 into the final desired position with the channel 160 connects the first parts and the second parts to achieve at least one of a fluid connection, and electrical connection, and/or a mechanical connection. However, in some embodiments, a sleeve 170 may terminate with connectors where the connectors are not arranged in a specific orientation on a connecting head 770. Similarly, in some embodiments, a channel 160 may terminate with connectors where the connectors are not arranged in a specific orientation on a securement plate 600.

Figure 8:
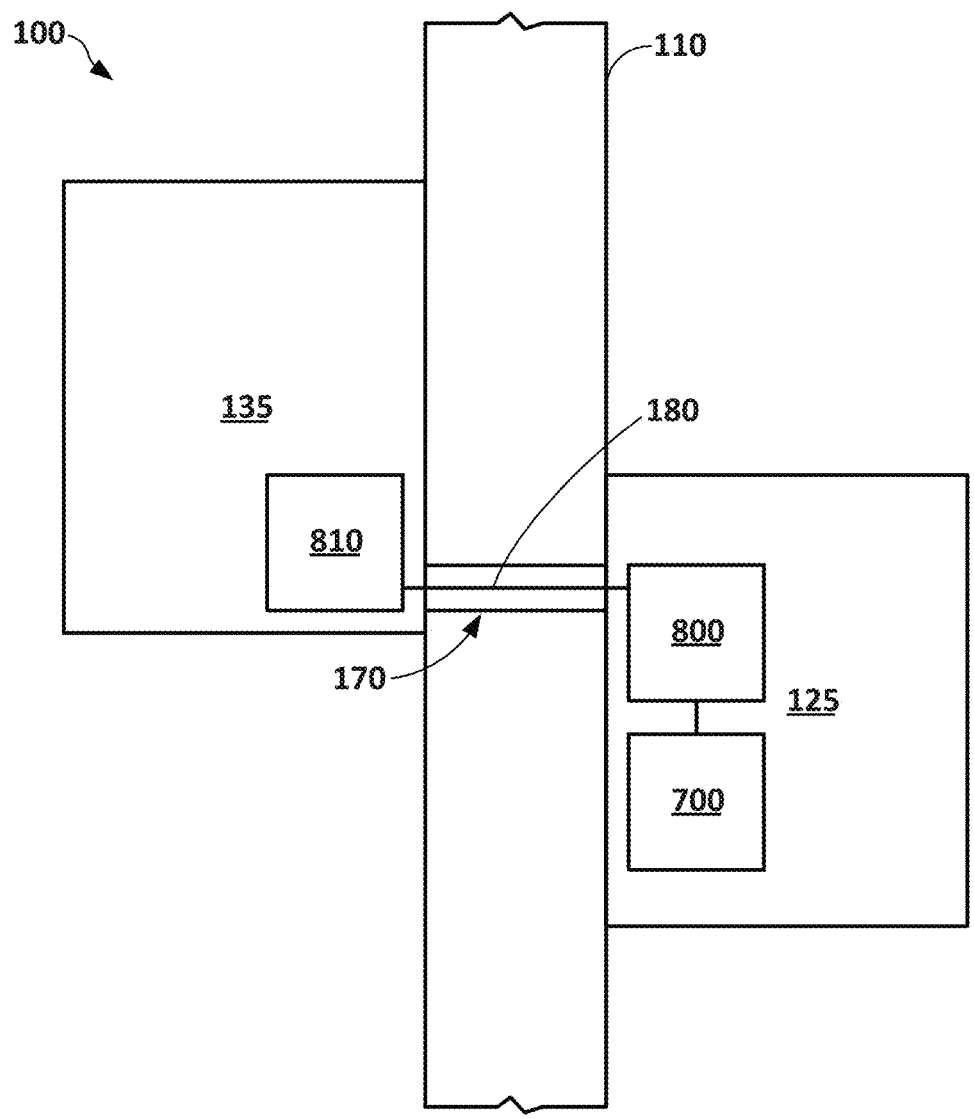
FIG. 8 is a block diagram illustrating an example modular air conditioning system, according to embodiments of the present disclosure.

FIG. 8 is a block diagram illustrating an example of a modular air conditioning system 100, in accordance with one or more aspects of the present disclosure. The HVAC system 100 shown in FIG. 8 represents only one example of a modular air conditioning system, and various other modular air conditioning systems may be used.

In the example of FIG. 8, the air conditioning system 100 includes a first unit 125, a second unit 135, and a sleeve 170. The first unit 125 may include a motor 800 and a first fan 700. The second unit 135 may include a second fan 810. While shown in the example of FIG. 8 as being included in the first unit 125, the motor 800 may, in some examples, be included in the second unit 135 instead. That is, in various examples, a motor 800 may be included in either a first unit 125 or in a second unit 135. In some embodiments, the first unit 125 and the second unit 135 may each have at least one dedicated motor.

The first unit 125 and the second unit 135, as shown in the example of FIG. 8, are on opposite sides of a wall 110. The first unit 125 and the second unit 135 are connected by a sleeve 170, which runs through the wall 110. In some examples, the sleeve 170 may be inserted through a hole in the wall 110. In some examples, the sleeve 170 may include tubing and/or pipe and/or duct, such as flexible tubing or rigid tubing that protects one or more cables, pipes, or other structures passing through the sleeve 170.

In the example of FIG. 8, the motor 800 may be an electrical motor powered by an electrical connection (not shown) connected to the first unit 125. In some examples, the motor 800 may be another kind of motor. The motor 800, in the example of FIG. 8, is connected to the first fan 700. For instance, the motor 800 may be permanently fixed to the first fan 700 such that rotation of the motor 800 may cause the first fan 700 to spin. Thus, increasing or decreasing the speed of the motor 800 may increase or decrease the speed of the first fan 700.

In the example of FIG. 8, the sleeve 170 houses a drive mechanism 180; e.g. a mechanical drive shaft. The drive mechanism 180 connects the motor 800 of the first unit 125 to the second fan 810 of the second unit 135. In some examples, the drive mechanism 180 may be a rigid drive shaft, such as an axle made of metal or other material. In some examples, drive mechanism 180 may be flexible or otherwise non-rigid. For instance, a mechanical drive shaft may be a flexible, wire-like cord encased in flexible plastic tubing. In other words, the drive mechanism 180 may be any component capable of transmitting mechanical angular energy from the motor 800 to the second fan 810, thereby enabling the motor 800 to cause the second fan 810 to spin. Thus, increasing or decreasing the speed of the motor 800 may also increase or decrease the speed of the first fan 700 and/or the second fan 810.

In some examples, the drive mechanism 180 may include u-joints, continuous velocity joints, gears, cogs, sprockets, or any other method of transferring mechanical angular energy. For instance, though shown in the example of FIG. 8 as moving only horizontally, a drive mechanism 180 may, in other examples, additionally or alternatively traverse a vertical distance between the motor 800 and the second fan 810. In some such examples, the motor 800 may be connected to a vertical shaft that ends in a beveled gear that interacts with another beveled gear in order to transfer the angular energy to a horizontal shaft that is connected to the second fan 810.

In some examples, sleeve 170 may additionally or alternatively house other components, such as components allowing for the transfer of one or more fluids (e.g. coolant, refrigerant, condensate, etc.) between the first unit 125 and the second unit 135, and/or components allowing for the transfer of energy/power (e.g. electricity) between the first unit 125 and the second unit 135, or other components. The sleeve 170 may, in some examples, also be used as a fastener or mounting bracket for the air conditioning system 100. For instance, instead of the first unit 125 being mounted to one side of a wall 110 and the second unit 135 being mounted to the other side of the wall 110, the first unit 125 and the second unit 135 may be attached to one another via the sleeve 170 (or by one or more connecting mechanisms), thereby allowing for easy mounting of the air conditioning system 100 to the wall 110. That is, a sleeve 170 may, in some examples, additionally serve as a mounting bracket for a modular air conditioning system 100.

Figure 9:
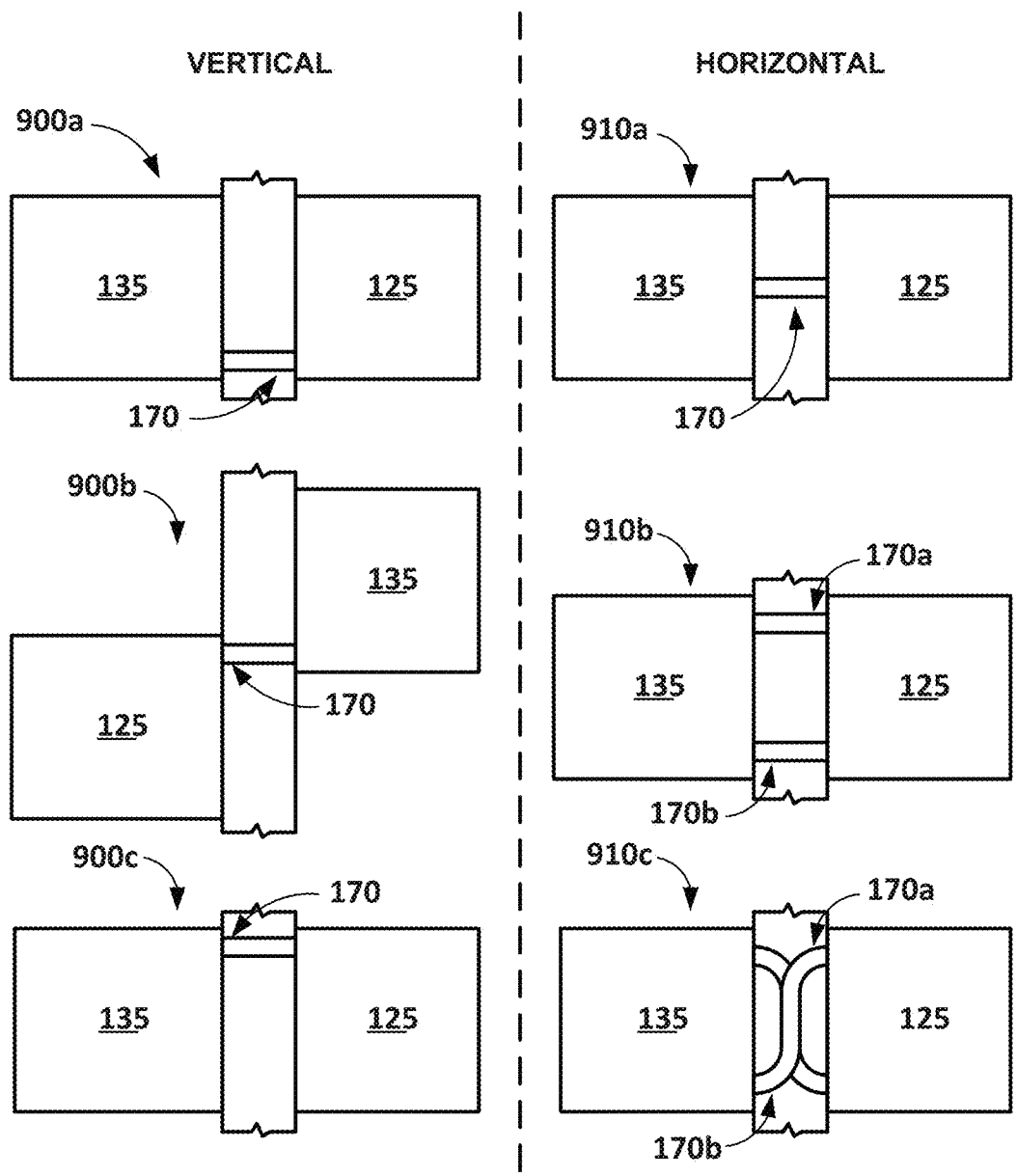
FIG. 9 is a block diagram illustrating example configurations of a modular air conditioning system, according to embodiments of the present disclosure.

FIG. 9 is a block diagram illustrating example configurations 900A-900C (collectively "vertical configurations 900") and 910A-910C (collectively "horizontal configurations 910") of a modular air conditioning system, in accordance with one or more aspects of the present disclosure. As one example, the vertical configurations 900 and the horizontal 910 may each be a configuration of modular air conditioning system 100 as described with respect to the example of FIG. 8.

As shown in the example of FIG. 9, the vertical configurations 900 may present a side view of a modular air conditioning system. The horizontal configurations 910 may present a top view of a modular air conditioning system. The vertical configurations 900 and the horizontal configurations 910 represent only a small sample of possible configurations, and various other configurations may be possible in other examples. The vertical configurations 900 and/or the horizontal configurations 910 may show only a subset of connections between a first unit 125 and a second unit 135. For instance, while shown as a single sleeve 170 in each of vertical configurations 900, multiple connecting mechanisms 500 may be present in various example configurations.

As shown in vertical configuration 900a, a first unit 125 and a second unit 135 may be at substantially the same height, and the sleeve 170 may be near the bottom of both the first unit 125 and the second unit 135. As shown in vertical configuration 900b, the first unit 125 may be higher than the second unit 135, and the sleeve 170 may be connected in the vertically overlapping regions of the first unit 125 and the second unit 135. As shown in vertical configuration 900c, the sleeve 170 may be near the top of each of the first unit 125 and the second unit 135.

As shown in horizontal configuration 910a, a first unit 125 and a second unit 135 may be connected via sleeve 170 near the center of the first unit 125 and the second unit 135. As shown in horizontal configuration 910b, a first unit 125 and a second unit 135 may be connected via two connecting mechanisms (500a and 500b), both disposed near the sides of the first unit 125 and the second unit 135. As shown in horizontal configuration 910c, a first unit 125 and a second unit 135 may be connected via two connecting mechanisms (500a and 500b), disposed near opposite sides of the first unit 125 and the second unit 135, and traversing horizontally between the first unit 125 and the second unit 135.

In each of the vertical configurations 900a-c and horizontal configuration 910a, a drive mechanism 180 may be included in the sleeve 170. In both of the horizontal configurations 910a and 910b, a drive mechanism 180 may be included in sleeve 170a, sleeve 170b, or in both connecting mechanisms (500a and 500b). That is, in some examples, there may be more than one drive mechanism 180 connecting a first unit 125 and a second unit 135.

Figure 10:
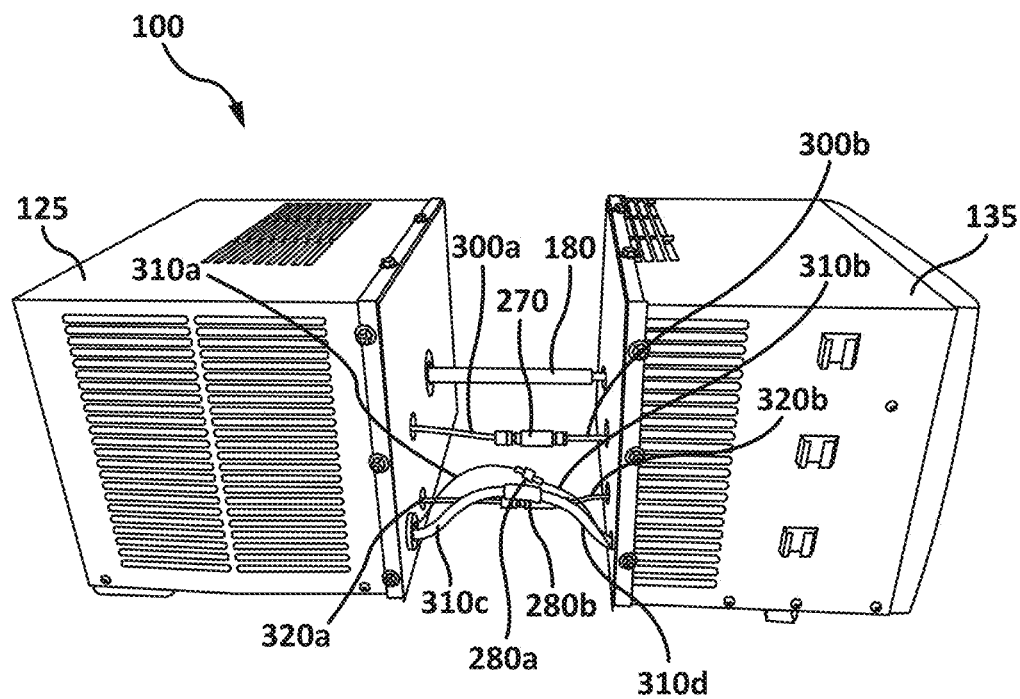
FIGS. 10 and 11 illustrate a modular air conditioning system with shared, connected elements (drive mechanism, electrical lines, and fluid lines), according to embodiments of the present disclosure.

FIG. 10 illustrates an exemplary air conditioning system 100 that includes a second unit 135 and a first unit 125. The air conditioning system 100 has several shared, connected elements, including a drive mechanism 180. Each unit of the air conditioning system 100, the second unit 135 and the first unit 125, have matching shared, connected elements that are attached using connectors. For example, the second unit 135 has an electrical line 310a that is attached to a corresponding electrical line 310b of the first unit 125, using electrical connector 280a. In addition, the second unit 135 has another electrical line 310c that is attached to a corresponding electrical line 310d of the first unit 125, using electrical connector 280b. In addition, the second unit 135 has a fluid line 300a that is attached to a corresponding fluid line 300b of the first unit 125, using fluid connector 270. In addition, the second unit 135 has a refrigerant line 320a that is attached to a corresponding refrigerant line 320b of the first unit 125, using a refrigerant connector (not shown). Thus, each of these connectors enable the transfer of power (e.g. electricity) and fluids (e.g. refrigerant, condensate) between the second unit 135 and the first unit 125.

Figure 11:
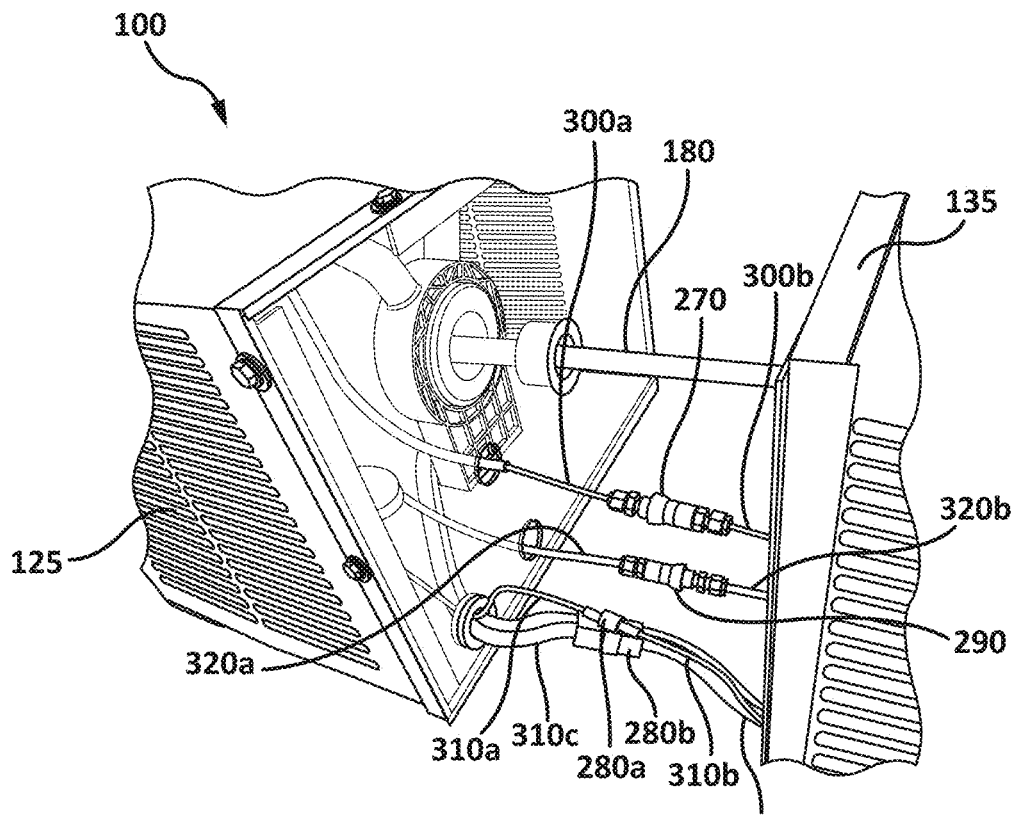

FIG. 11 illustrates a closer view of the exemplary air conditioning system 100 shown in FIG. 10 where the refrigerant connector 290 is visible.

Figure 12A:
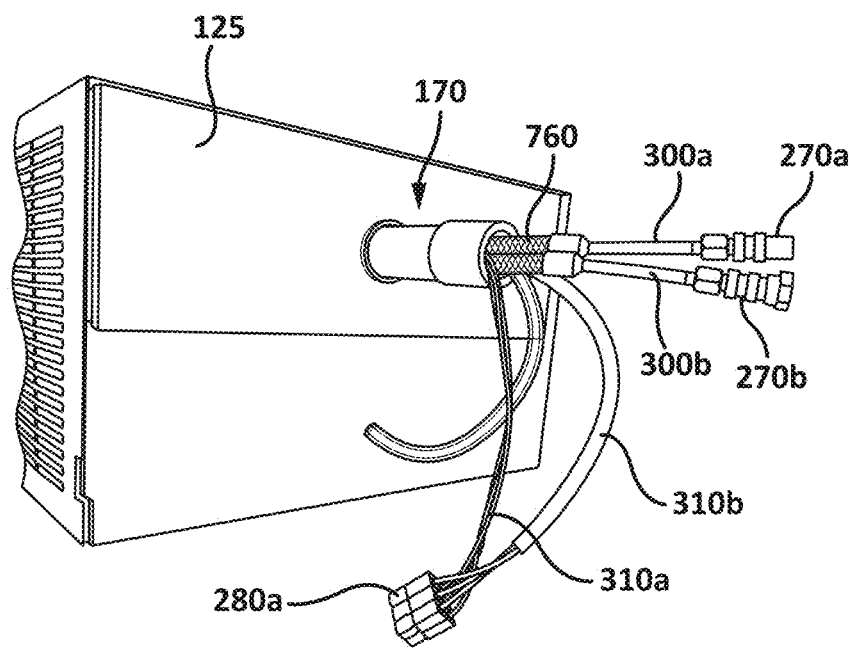
FIGS. 12a and 12b illustrate features of a modular air conditioning system, according to embodiments of the present disclosure.
Figure 12B:
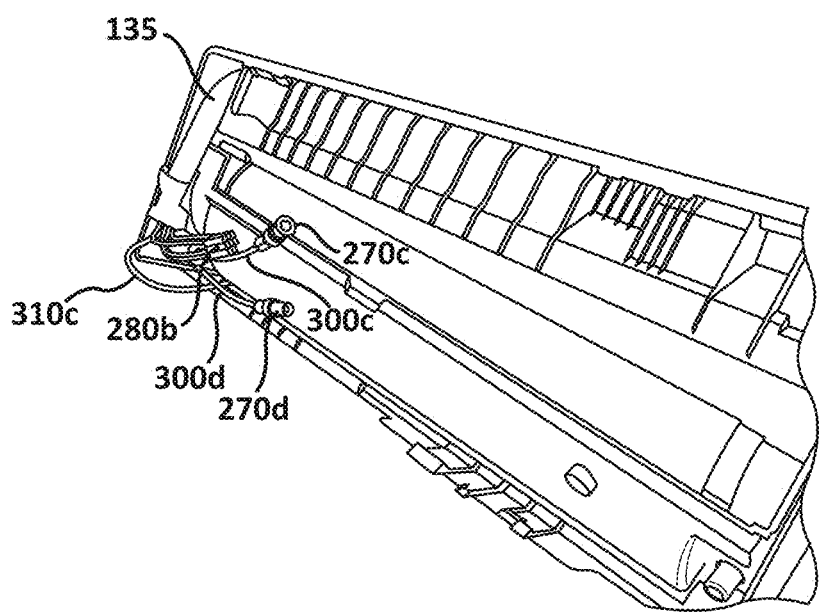
Figure 13:
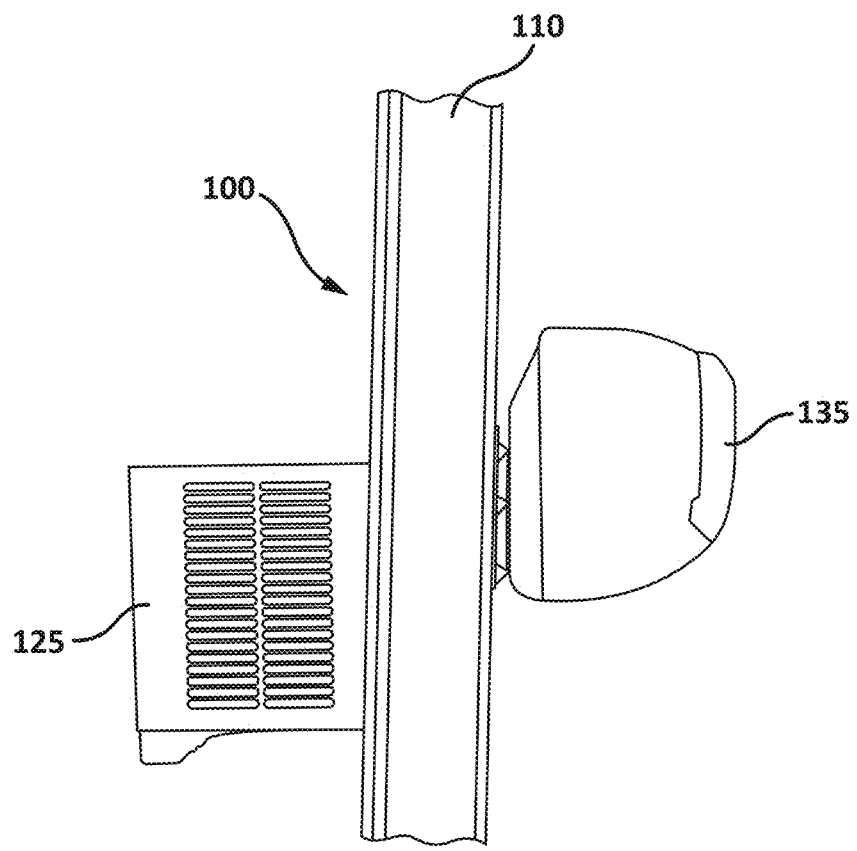
FIG. 13 illustrates feature of a modular air conditioning system, according to embodiments of the present disclosure.

FIGS. 12a and 12b illustrate an exemplary first unit 125 and an exemplary second unit 135 respectively of an exemplary modular air conditioning system, according to embodiments of the present disclosure. FIG. 12a shows a sleeve 170 (and/or sleeve 170) extending from the housing of the first unit 125. The sleeve 170, as described above, may be inserted through a hole in a wall (not shown) to provide the structural support needed to position the first unit 125 in the desired location. Contained within the sleeve 170 are fluid lines (300a and 300b) terminated with the first parts of two fluid connectors (270a and 270b), and electrical lines (310a and 310b) terminated with the first part of an electrical connector 280a. FIG. 12a illustrates that the fluid lines (300a and 300b) may be positioned within flexible tubing 760. FIG. 12b shows the corresponding fluid lines (300c and 300d), electrical line 280b, the second parts of the fluid connectors (270c and 270d), and the second part of the electrical connector 280b. Thus, the first part and second part of each connector may physically align and join together to complete a fluid, mechanical, and/or electrical connection. In some embodiments of the present disclosure, the first part(s) and second part(s) of a connector(s) may physically join together (e.g. to make a liquid seal, to link opposite sides of a drive shaft, and/or to complete an electrical circuit) by the act of placing/moving the second unit 135 into the desired position relative to the first unit 125. For example, referring again to FIGS. 2 and 3, insertion of the sleeve 170 of the first unit 125 into the channel 160 of the second unit 135 may bring the connecting head 770 (see FIG. 7) at the distal end of the sleeve 170 into physical contact with the face plate 220 positioned within the channel 160 of the second unit 135. This contacting of the face plate 220 with the connecting head 770, may position, align, and physically connect the opposing parts of one or more connectors (e.g. fluid, mechanical, and/or electrical) such that the first unit 125 and the second unit 135 are subsequently in fluid, mechanical, and/or electrical communication. FIG. 13 illustrates an exemplary modular air conditioning system 100 that may result from the elements and installation steps described above for FIGS. 12a and 12b.

The present disclosure provides connecting devices for reversibly connecting or coupling two conduits together. The present disclosure also describes systems and applications that utilize such fluid connectors, including for example, space conditioning systems for structures such as buildings or homes. Modular systems are also described that may be suitable for buildings ranging from low load homes to large multifamily buildings. In some embodiments of the present disclosure, a modular space conditioning system (e.g. air conditioning system) may be configured for small residential buildings, small commercial buildings, large commercial or industrial buildings, as well as any other structure that may benefit from space conditioning. For example, other suitable structures that may be conditioned by some of the embodiments described herein include transportation vehicles such as buses, trucks, trains, boats, planes, shipping containers and ships.

Some of the air conditioning systems described herein may include a condenser unit and an evaporator unit separated and connected by a connecting mechanism, where the connecting mechanism may be configured to minimize both the amount of fluid contained in the air conditioning system, the amount of potential fluid lost from the air conditioning system (e.g. the condenser unit and/or evaporator unit), and the amount of air introduced into the air conditioning system during installation. However, some embodiments of fluid connectors described herein may provide benefits to any system or application that requires isolating fluids contained within their respective physical elements from the surrounding environment. For example, systems utilizing toxic or corrosive fluids may benefit from the fluid connector systems described herein, as well as applications requiring the use of sterile and/or sanitary fittings. Other benefits of the fluid connectors described herein include minimal pressure drop due to fluid flow through the fluid connector, and the ability to utilize both parts of the fluid connector in both vacuum and/or pressure conditions, while the two parts are physically connected and/or separated. These advantages may enable the systems that utilize the fluid connectors to be portable and modular, and to be supplied to the end user or consumer pre-charged with the working fluid of choice; e.g. refrigerant for an air conditioning case. In addition, some of the fluid connectors described herein may be coupled and/or decoupled while under pressure and/or vacuum without mixing the fluids contained within the fluid connectors and/or conduit with each other and/or without mixing with the fluid in the outside environment.

FIGS. 14a and 14b provide an exemplary embodiment of a fluid connector 1100 for connecting two separate conduits together to create a single continuous flow path for a fluid through both conduits and the fluid connector 1100. The fluid connector 1100 has two separate parts that are mechanically and reversibly connected to one another. For illustrative purposes, FIGS. 14a and 14b show both parts 1110 and 1180 aligned along a longitudinal reference axis. The first part 1110 includes a wall 1130 defined by a proximal end and a distal end, which further define a length for the wall 1130, where the length is substantially parallel to the longitudinal axis. The wall 1130 may be configured in a circular shape, or any other suitable shape, which is positioned around the longitudinal axis to form an internal fluid channel 1135. The fluid channel 1135 includes a first wide portion positioned towards the proximal end of the wall 1130 and defined by a length $D_w$, and a second narrow portion positioned towards the distal end of the wall 1130 and defined by a length $D_n$. The wide portion and the narrow portion are connected together by a tapered portion to create a continuous inside surface for the wall 1130 and the internal fluid channel 1135. The wall 1130 also includes a second contact surface 1174 that may be positioned substantially perpendicular to the longitudinal axis and facing the distal direction.

The first part 1110 of the fluid connector 1100 also includes a plug 1170 with a first contact surface 1172. The first contact surface 1172 may also be positioned substantially perpendicular to the longitudinal axis and facing the distal direction. The plug 1170 is reversibly moveable between at least two positions, a disconnected and sealed position, and a connected position, represented by FIGS. 14a and 14b respectively. In the first position, FIG. 14a, the plug 1170 is positioned within the portion of the fluid channel 1135 defined by the narrow length $D_n$. In this first position, the plug 1170 forms a liquid seal between the opposing radial surfaces of the plug 1170 and the narrow portion of the wall 1130. In some embodiments of the present invention, the formation of the liquid seal may be assisted by the use of o-rings, gaskets, and the like (not shown). Thus, while in the disconnected position (FIG. 14a), the plug 1170 may create a fluid seal sufficient to operate the conduit on the proximal side and the first part 1110 while under significant pressure and/or under vacuum. For example, operating pressures within the first part 1110 may be up to 500 psia and/or less than 14.7 psia.

The second part 1180 of the fluid connector 1100 includes a wall 1190 with a distal end and a proximal end. The wall 1190 of the second part 1180 may be aligned substantially parallel to the longitudinal axis, and positioned around the axis to form an internal fluid channel 1195. The second part 1180 includes a plug 2010 positioned along and parallel to the longitudinal axis. The plug has a first contact surface 1192 that may be configured substantially perpendicular to the longitudinal axis and facing the distal direction. In some embodiments of the present invention, the plug 2010 is positioned along the longitudinal axis such that its first contact surface 1192 faces the first contact surface 1172 of the first part 1110. The plug 2010 is configured to form an annular space between itself and the inside surface of the wall 1190. The second part 1180 includes a ring 2050, which includes a second contact surface 2020 positioned substantially perpendicular to the longitudinal axis and facing the distal direction. The ring 2050 is reversibly moveable between the two positions, as shown in FIGS. 14a and 14b. In the first position, FIG. 14a, the ring 2050 is positioned substantially within the annual space defined by the inside surface of the wall 1190 and the plug 2010, such that a liquid seal is created between the opposing radially oriented surfaces of the plug 2010 and the ring 2050. A liquid seal may also exist between the opposing radially oriented surfaces of the ring 2050 and the inside surface of the wall 1190. In some embodiments of the present invention, one or both of these liquid seals may be assisted by the use of o-rings, gaskets, or any other suitable sealing mechanism (not shown). Thus, while in the unconnected position (FIG. 14a) the ring 2050 may create a fluid seal sufficient to operate the conduit on the distal side of the second part 1180 under significant pressure and/or under vacuum. For example, operating pressures within the second part 1180 may be up to 500 psia and/or less than 14.7 psia.

FIG. 14b illustrates the second connected, position for both the first part 1110 and the second part 1180, after the two parts have been joined to form a sealed fluid connector 1100 for transferring fluid from one conduit to another. In some embodiments of the present invention, the first part 1110 and the second part 1180 are physically connected to each other by a reversible mechanism, which may include, for example, complementary threads, slot and groove mechanisms, quick disconnect mechanisms, and/or any other suitable connecting mechanism. In the process of connecting the two parts, a second contact surface 1174 of the wall 1130 of the first part 1110 pushes against the opposing second contact surface 2020 of the ring 2050 of the second part 1180. As a result, the ring 2050 is displaced in the longitudinal direction towards the distal end of the wall 1190 of the second part 1180. Simultaneously, the first contact surface 1172 of the plug 1170 of the first part 1110 is brought into contact with the first contact surface 1192 of the plug 2010 of the second part 1180. This results in the plug 2010 of the second part 1180 displacing the plug 1170 of the first part 1110 into the wider portion of the fluid channel 1135, in the proximal direction. As shown in FIG. 14b, once the second position is fully attained, both plugs 1170 and 2010 are positioned substantially within the wide radius portion of the fluid channel 1135 of the second part 1110. This results in the formation of a continuous, uninterrupted flow path for fluid to take from the distal conduit, through the second part 1180, through the first part 1110, and through the proximal conduit to its destination downstream. Alternatively, depending on the differential pressures in the system, flow may move from the proximal conduit to the distal conduit.

Without wishing to be bound by theory, it is believed that the mechanism of joining the first part 1110 and the second part 1180 will minimize fluid loss from the system (e.g. the conduits), while also minimizing the introduction of air or any other external fluid into the system. This may be achieved largely due to the alignment and interaction of the opposing contact surfaces, as well as due to the movement of the two plugs, along the longitudinal axis, within the fluid channels of the fluid connector 1100.

The reverse scenario, disconnecting the two parts of the fluid connector 1100, results in the interruption of fluid flow. Disconnecting the first part 1110 from the second part 1180, results in both plug 1170 and plug 2010 moving (relative to the wide portion of fluid channel 1135) in unison along the longitudinal axis in the distal direction. In so doing, both plugs 1170 and 2010 are withdrawn from the wide portion (defined by $D_w$) of the fluid channel 1135 of the first part 1110. Plug 1170 of the first part 1110 is returned to its sealing position in the narrow portion (defined by $D_n$) of the fluid channel 1135, while simultaneously, the ring 2050 of the second part is repositioned in its sealing position within the annular space between the plug 2010 and the inside surface of the wall 1190 of the second part. The end result is that the proximal conduit, and liquid therein, are isolated from the distal conduit and the environment by the fluid seal created between the plug 1170 and the inside surface of the wall 1130 of the first piece. Simultaneously, the distal conduit, and the liquid therein, are isolated from the proximal conduit and the environment by the fluid seals created between the plug 2010, the ring 2050, and the inside surface of the wall 1190 of the second part 1180.

Figures 15A, 15B:
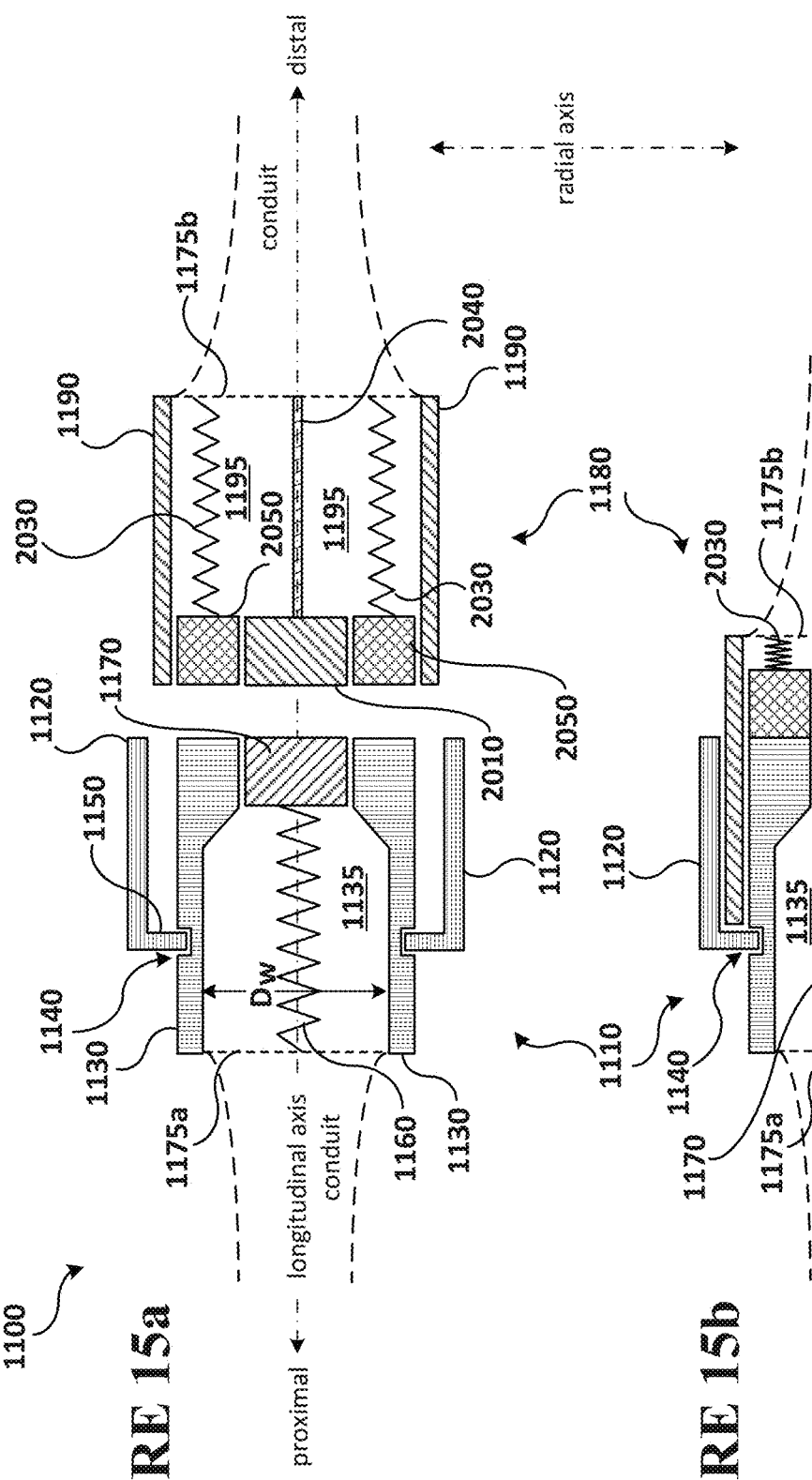
FIGS. 15a and 15b illustrate two parts of a fluid connector, both in a first position FIG. 15a, where the two parts are not connected with no fluid flow, and in a second position FIG. 15b, where the two parts are connected to allow fluid flow through the two parts, according to embodiments of the present disclosure.

FIGS. 15*a* and 15*b* illustrate additional features of some embodiments of the present invention, where both positions are shown again, with a first unconnected position (FIG. 15*a*) and a second connected position (FIG. 15*b*). The first part 1110 may include a collapsible resistance element 1160, which may be positioned along the longitudinal axis. Examples of a collapsible resistance element 1160 include a spring, a piston, a magnetic mechanism, and/or any other suitable resistance element. For the case of a spring, the distal end of the spring may be attached to a proximal surface of the plug 1170, and the proximal end of the spring may be attached to a stationary stop 1175. The purpose of the stop 1175 is to prevent the collapsible resistance element 1160 and the plug 1170 from being irreversibly displaced into the proximal conduit upon joining of the first part 1110 with the second part 1180 of the fluid connector 1100. Examples of a suitable stop 1175 include any kind of structural support that allows the flow of fluid through the fluid connector 1100. Examples of suitable stops 1175 for securing the proximal end of a collapsible resistance element include one or more support bars, rods, or wires. Another example of a stop 1175 may be a wire mesh.

The first part 1110 may also include a moveable collar 1120 positioned around the wall 1130. Examples of a moveable collar 1120 include a nut or a flange. In some cases, the collar 1120 may form an annular space between an inside surface of the collar 1120 and an outside surface of the wall 1130 of the first part 1110. In addition, the collar 1120 may also include threading (not shown) positioned along an inside surface of the collar 1120. Such threading may reversibly connect with threading (not shown) positioned on the outside surface of the wall 1190 of the second part 1180. However, a mechanism other than threading may be provided on both the first part 1110 and the second part 1180 to enable the reversible joining of the two parts; e.g. slot-and-groove, quick disconnecting hardware, etc.

Referring again to FIGS. 15*a* and 15*b*, the second part 1180 may also include a collapsible resistance element 2030 positioned along the longitudinal axis and between a distal surface of the ring 2050 and a stop 1175. Examples of a collapsible resistance element 2030 include a spring, a piston, a magnetic mechanism, and/or any other suitable resistance element. For the case of a spring, the proximal end of the spring may be attached to a distal surface of the ring 2050, and the distal end of the spring may be attached to a stationary stop 1175. The purpose of the stop 1175 is to prevent the collapsible resistance element 2030 and the ring 2050 from being irreversibly displaced into the distal conduit upon joining of the first part 1110 with the second part 1180 of the fluid connector 1100. Examples of a suitable stop 1175 include any kind of structural support that allows the flow of fluid through the fluid connector 1100. Examples of suitable stops 1175 for securing the proximal end of a collapsible resistance element include one or more support bars, rods, or wires. Another example of a stop 1175 may be a wire mesh.

The second part 1180 may include a rigid resistance element 2040 positioned substantially along the longitudinal axis, with a proximal end (not called out) connected to a distal surface (not called out) of the plug 2010, and with a distal end connected to a stop 1175. A rigid resistance element 2040 may be, for example, a bar, a rod, or any other physical element capable of holding plug 2010 in a substantially fixed position, relative to the wall 1190 of the second part 1180. The purpose of the stop 1175 is to prevent the plug 2010 and the rigid resistance element 2040 from being irreversibly displaced into the distal conduit upon joining/connecting of the first part 1110 with the second part 1180 of the fluid connector 1100. In some cases the stop used to help maintain the position of ring 2050 and the collapsible resistance element 2030, and the stop used to maintain the position of the plug 2010 and the rigid resistance element 2040 may be the same stop 1175 (as shown in FIGS. 15*a* and 15*b*). Alternatively, one or more stops may be used to maintain the positions of the various elements of the second part 1180.

FIG. 15*b* illustrates the relationships and positions of the various elements of one embodiment of the present invention, when the first part 1110 and the second part 1180 are joined to make a sealed fluid connector 1100 that connects the proximal conduit and the distal conduit, to allow fluid flow between the two. The joining of the two parts 1110 and 1180 of the fluid connector 1100 may begin by aligning the various contact surfaces along the longitudinal axis, and then pressing the contact surfaces together. Specifically, as described in FIGS. 14*a* and 14*b* above, the process of connecting the two parts may begin by orienting the first contact surface 1172 of plug 1170 such that it opposes and faces the first contact surface 1192 of plug 2010, while simultaneously orienting the second contact surface 1174 of wall 1130 such that it opposes and faces the second contact surface 2020 of ring 2050. With this alignment achieved, the two parts 1110 and 1180 may be joined by physically pressing the two parts 1110 and 1180 together. Sufficient force may need to be applied to at least overcome the forces supplied by collapsible resistance elements 1160 and 2030. In the case of threaded components, sufficient force to join the two parts 1110 and 1180 may be achieved by rotating collar 1120 around the longitudinal axis. The collar 1120 may be held in a fixed position relative to the longitudinal direction and relative to the wall 1130, by providing a lip 1150 on the proximal end of the collar 1120 that inserts into a catch 1140 located on an outside surface of the wall 1130.

As the first part 1110 and the second part 1180 are drawn together (e.g. by the rotation of a threaded collar 1120 engaged with complementary threads located on the outside surface of wall 1190, threads not shown), plug 2010 may be moved in the proximal direction, relative to the wall 1130 of the first part 1110. As plug 2010 moves in the proximal direction, it compresses collapsible resistance element 1160, allowing the simultaneous movement of plug 1170 in the proximal direction, finally resulting in the placement of both plugs 1170 and 2010 within the wide portion of the fluid channel 1135. At the same time, as plug 2010 moves into the fluid channel 1135 of the first part 1110, the distal end of wall 1130 moves in the distal direction relative to the wall 1190 of the second part 1180 and, in so doing, compresses collapsible resistance element 2030 and moves ring 2050 in the distal direction relative to wall 1190. The result is an unobstructed path for fluid (e.g. refrigerant) through the fluid channel 1135 of the first part 1110 and the fluid channel 1195 of the second part 1180, and a leak-free connection between the first part 1110 and the second part 1180.

The leak-free connection between the first part 1110 and the second part 1180 of the fluid connector 1100 may be disconnected in a similar fashion. The plug 2010 of the second part 1180 may be withdrawn from the fluid channel 1135 of the first part 1110 by moving the plug 1170 in the proximal direction relative to wall 1130 of the first part 1110. For example, for a collar 1120 configured with threads (not shown) engaging complementary threads (not shown) positioned on the outside surface of the wall 1190, rotation of the collar 1120 around the longitudinal axis may result in the removal of the wall 1190 from the annular space created by the collar 1120 and the wall 1130. As the wall 1190 in this example is physically connected to the stop 1175, the rigid resistance element 2040, and the plug 2010, movement of the wall 1190 in the distal direction causes corresponding movement in each of these elements. However, the ring 2050 remains pressed against the distal end of the wall 1130 of the first part 1110, due to the forces provided by the collapsible resistance element 2030, until the wall 1190 of the second part 1180 is completely removed from the collar 1120 of the first part 1110. Once this is achieved, and the wall 1190 is completely removed from at least the threaded portion of the collar 1120, and the plug 2010 is repositioned within the ring 2050 of the second part to reform the liquid seal of the second part 1180. In addition, the plug 1170 of the first part 1110 is repositioned within the narrow portion of the fluid channel 1135 of the first part 1110 to reform the liquid seal of the first part 1110.

The process of joining and disconnecting the two parts of the fluid connector may be repeated as needed for a particular application. For example, for an air conditioning application, the fluid connector may be joined together only once, and maybe only disconnected at the end of the system's life. In some embodiments of the present invention, a fluid connector may have circular seals that allow for the removal of air when pressed together. Fluid connectors may also have two or more components that may be threaded together, such that when the threads are tightened, opposing rigid elements and compressible elements result in the creation of a continuous fluid path through the fluid connector that prevents exposure of the fluid to the ambient environment. In some embodiments of the present invention, fluid connectors may be configured with sufficient cross sectional areas to minimize pressure drops through the fluid connectors due to the flow of fluids through the fluid connectors.

Figure 16A:
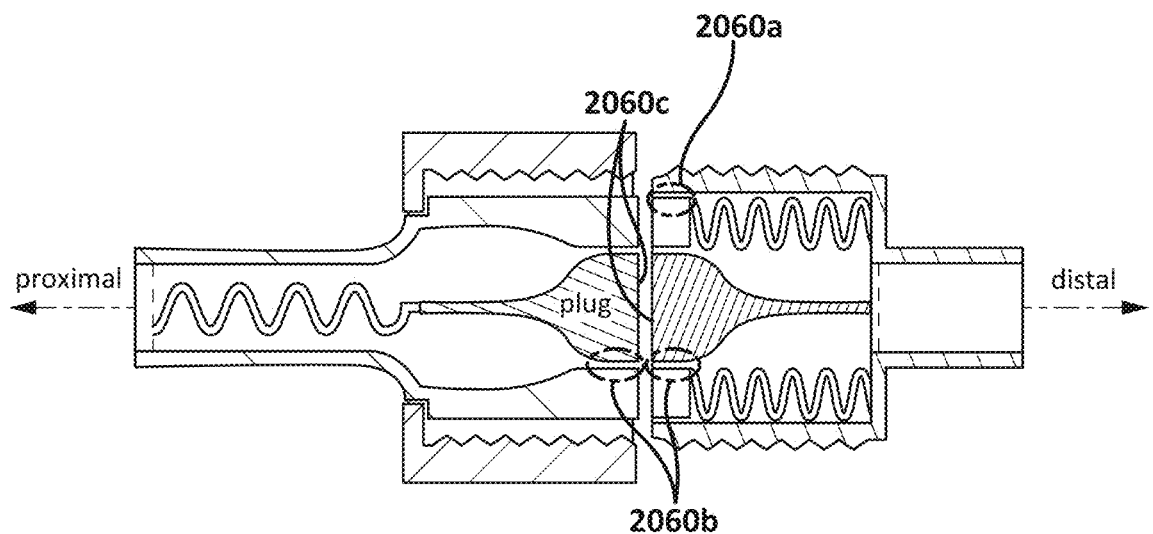
FIGS. 16a and 16b illustrate two parts of a fluid connector, both in a first position FIG. 16a, were the two parts are not connected with no fluid flow, and in a second position FIG. 16b, where the two parts are connected to allow fluid flow through the two parts, according to embodiments of the present disclosure.
Figure 16B:
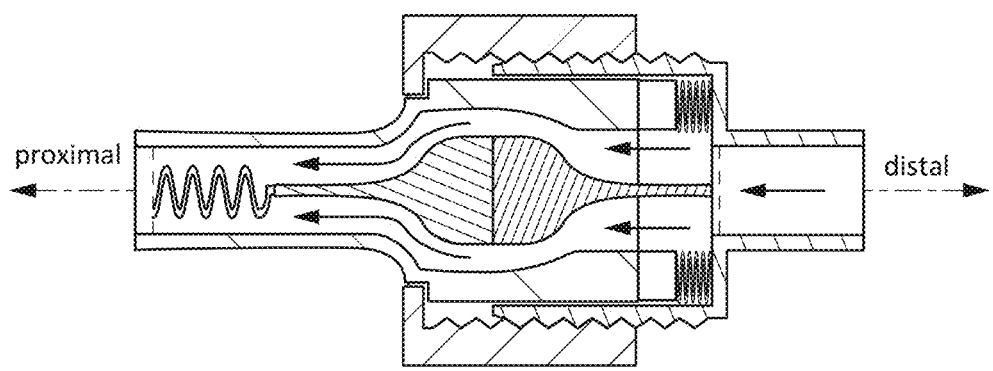

Another embodiment of the present invention is provided in FIGS. 16*a* and 16*b*. In this example, at least three seals separate the external environment from the fluids contained in the tube or pipe. A face seal 2060*c* may form an initial seal that may prevent any further contact between wetted parts and external environment. This aspect is important for many applications, including refrigeration applications, because air must be substantially absent from the refrigerant. Another seal 2060*b* prevents leakage of fluid from the internal volume to the external environment when the two parts of the fluid connector have not yet been joined. Situations where the two parts may not be connected include during storage of the system using the fluid connector (e.g. in the warehouse), during transit or shipping of the system, or during any other suitable or required period.

In some embodiments, the fluid connector may include physical stops that engage the plugs to limit their movement to pre-defined zones. In addition to preventing, for example, the plugs from exiting their respective fluid channels, stops may also help provide better fluid seals during operation (connected) and during periods of non-use (disconnected). Note that FIG. 16*b* shows fluid flow in the proximal direction. This is for illustrative purposes and flow may be in either direction; e.g. in the distal direction or in the proximal direction.

Figure 17:
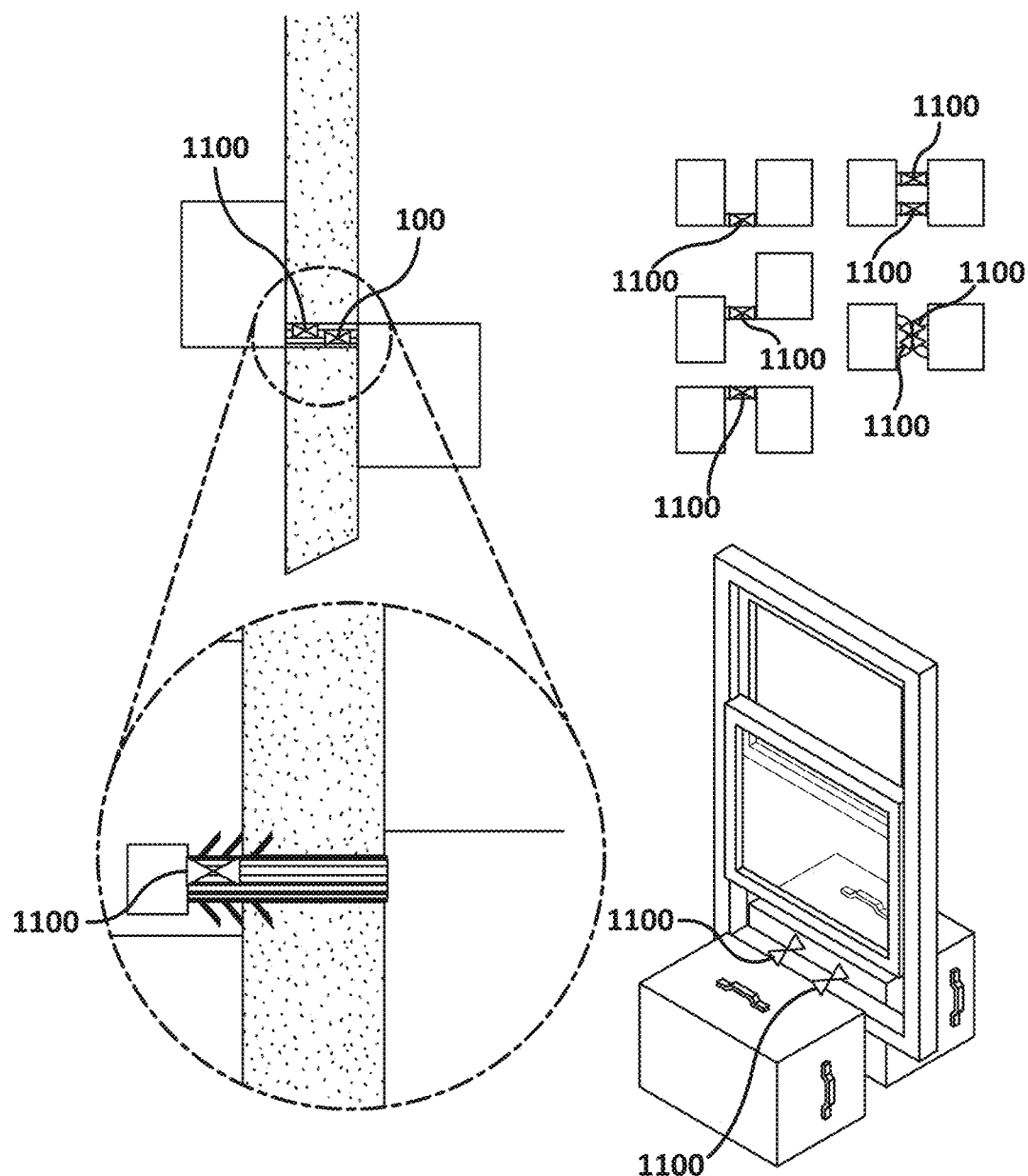
FIG. 17 illustrates an air conditioning system that may utilize a fluid connector similar to those illustrated in FIGS. 14-16, according to embodiments of the present disclosure.

FIG. 17 illustrates an air conditioning system that may incorporate a fluid connector 1100 similar to the ones describe above. The conditioning system may include an evaporator and a condenser positioned on opposite sides of a wall. The evaporator and the condenser may be connected by at least two refrigerant lines, at least one condensate line, and at least one electrical line. The refrigerant line and/or the condensate lines may include a fluid connector as described herein, to allow the evaporator and the condenser to be shipped separately, fully charged with their operating fluids. Upon arrival at the point of use, the evaporator and the condenser may be joined by configuring the fluid connectors 1100, as described above.

Referring again to FIG. 17, the relative position or height of the evaporator and condenser may be chosen to facilitate condensate drainage away from the evaporator. The condenser may be equipped with handles to facilitate installation from inside the structure, for example, through a window. An additional structure such as a cradle may be provided with the evaporator and/or condenser to further assist with installation. One possible mounting location is under a window, which may allow the condenser to be lifted through a window from the inside and more easily mounted than from outside the structure. In some embodiments, the condenser may be configured to have a low profile away from the wall that it is mounted to. This may decrease mounting force and improve the visual appearance and aesthetics of the system. The conditioning system may include a paintable casing that may be painted to better match structure exteriors. In some embodiments of the present invention, the conditioning system may be configured to be mounted in a window, while still allowing the window to be substantially closed. Any remaining open area of the window may be filled with an insulating material such as extruded polystyrene foam. However, some embodiments of the present invention do not require a window at all and instead may be mounted directly to a wall.

The refrigeration and/or condensate lines that extend through a wall or partition may be equipped with flanges or similar devices to assist with maintaining the condenser or evaporator in the desired position on the wall during installation. In some cases, both the condenser and the evaporator may be mounted on a wall. In other scenarios, one or both of the condenser and evaporator may be placed on the ground or a floor, such that the two components are connected using longer refrigeration and/or condensate lines that extend up to a window. Alternatively, holes through the wall may be made at whatever level the condenser and evaporator are positioned, to minimize the lengths of piping and conduit needed to connect the two together.

In some embodiments of the present invention, an air conditioning system may be in wireless and/or wired communication with one or more other air conditioning systems in the structure to facilitate coordinated space conditioning. Some systems may also include occupancy sensors and/or complex control algorithms to enable remote and/or autonomous control and operation of the air conditioning. Such system may be envisioned as multiple "nodes" where node includes an evaporator and a condenser connected together by at least one of the fluid connectors described above.

In some examples, the modular conditioning systems describe herein may be pre-charged with their working fluids to eliminate or minimize the need for adding or adjusting the fluid charge to the system at the installation site. This feature may eliminate the requirement for a professional or certified installer, making these systems more appealing to the do-it-yourself homeowner. Alternatively, the evaporator or condenser may be evacuated rather than charged with refrigerant if desired. For a system that includes multiple nodes, each individual node may be adjusted as needed.

The present disclosure provides embodiments of modular air conditioning systems. These systems may be separated into a condenser unit and an evaporator unit (or air handler). However, the air conditioning systems described herein have, among other features, the simplicity of driving mechanical components (e.g., fans) in both units using one or more motors. A single motor embodiment may offer design simplifications and cost savings, compared to systems utilizing two motors. Thus, in some embodiments of the present disclosure, air conditioning systems may provide a significant advancement in decreased system complexity. As a result, such air conditioning systems may reduce the cost of manufacturing. Furthermore, the unified drive mechanism described herein may enable expanded mounting and locating abilities for various air conditioners.

In some embodiments described herein, the evaporator and condenser fans may be powered utilizing a single shaft from a single motor. Such air conditioning systems may be made of separable components. A shaft connection may have one or more universal joints (u-joints) or may drive one fan via a flexible drive cable to account for imperfect alignment between an evaporator unit and condenser unit. Such flexibility may be used when the units are separated by a wall in a building, which may not have perfectly parallel sides.

The modular air conditioning systems described herein may leverage low-cost, mass produced components that are easy to fabricate and implement in order to improve localized space conditioning. Furthermore, the systems described herein may save energy through zoned space conditioning (e.g., buy one or more units to fit the cooling needs of the space). Finally, the modular systems may offer improved aesthetics, reduce the obstruction of windows or other viewports, offer improved comfort, save money on utility bills, require lower initial cost than related art systems, and enable easy user-installation (e.g., DIY systems).

The system and techniques described herein may reduce costs for modular air conditioning systems, and enable a new class of products that fills the gap between low cost, lower performance items like room air conditioners and high cost, higher performance items. Furthermore, the present disclosure may enable placement of existing modular systems in locations other than windows without increasing cost or requiring large holes in walls, which may be major impediments for sales, and serve as sources of customer dissatisfaction with room air conditioners.

Embodiments of the present disclosure describe modular air conditioning systems that may address many of the major drawbacks of room air conditioners-including window, through-the-wall, portable air conditioners and ductless modular heat pumps. Embodiments of air conditioning systems provided herein may be quieter, more efficient, for both heating and cooling, while occupying less window space, and providing more aesthetically pleasing heating and cooling solutions that do not jeopardize home security. In addition embodiments of air conditioning systems presented herein may provide simpler home installation methods for year-round air conditioning use. All of these benefits may be achieved while maintaining the affordability that is so important to many consumers. The air conditioning systems presented herein divide the air conditioning system into two separate yet tightly integrated parts, with a first part positioned external to the home, with the second part positioned in the interior. These two parts may be easily integrated into the complete air conditioning system, using simple connecting mechanisms that traverse a hole spanning the exterior wall of the structure to be heated/cooled. Installation is simple, and does not require professional installation, and only requires the use of a drill capable of producing the hole spanning the wall.

The systems and methods presented in this disclosure eliminate problems associated with window-mounted air conditioners, which are the most popular units installed in U.S. homes. Window-mounted air conditioners tend to leak air, even when they are installed correctly, and are often installed incorrectly. This draws hot summer air into the home, lessening the effectiveness and efficiency of the air conditioner and often allows outside noise and water intrusion into the home. If a window-mounted air conditioner is left in the window during periods of cold environmental temperatures, air leakage may create drafts and allow heat to escape from the home. Even when window-mounted air conditioners are installed to manufacturers' instructions, the air leakage can equal a 6-square-inch hole in the wall. Eliminating this air leakage yields roughly the same performance increase as moving from a minimum-efficiency unit to an Energy STAR unit, or approximately a 10%-15% energy savings. Studies have found that for the multifamily residential buildings in New York City alone, the annual energy losses added up to $130-$180 million, and the associated carbon dioxide emissions from those energy losses totaled 375,000-525,000 tons of carbon dioxide. In addition, window mounts can present a safety concern, because an air conditioner can potentially fall from the window and land on people or property below. And, of course, window-mounted air conditioners take away the functionality of the window they are mounted in, which can be a significant issue in apartments with few windows or only one. In single-window apartments, blocking the only window presents a safety hazard, because it could block an alternate egress path to flee a building fire. If improperly installed, window air conditioners can also create a security risk, providing relatively easy entry for a criminal.

Window-mounted air conditioners also tend to be noisy, due to the compressor, which is located within the air conditioner, and there is minimal sound muffling between the compressor and the interior of the room. In contrast, embodiments of air conditioning systems disclosed herein place the compressor outside the building, and the connecting mechanisms to the interior minimizes sound propagation into the building, so the air conditioning systems presented herein may be much quieter.

The national benefits of developing and providing advanced air conditioning systems become clear when the magnitude of the market is considered. According to the Energy Information Administration (EIA's) Residential Energy Consumption Survey, 25.9 million U.S. households are using room air conditioners, and considering multiple units in some households, the total number of room air conditioners in use is more than 44 million. In addition, annual shipments of window air conditioners total 8 million units in the United States. About 90% of those units are to replace older units, so the market actually has a high turnover rate, with roughly 16% of installed air conditioners being replaced every year. In fact, the EIA notes a significant business opportunity to retrofit homes with new, more efficient air conditioning, noting that 20% of homes built during the 1980s have air conditioning equipment more than 20 years old.

Based on these figures, and weighting them for each climate region of the United States (each of which has unique cooling needs), it is estimated that the nation's residential air conditioners use 1.02 quadrillion Btu, or 1.02 "quads," of electricity. But because most U.S. electricity is generated at inefficient steam power plants, this results in 3.07 quads of energy at the source. For comparison, the U.S. residential sector consumed roughly 21.6 quads of energy in 2014, so air conditioning is currently responsible for about 14.2% of U.S. energy consumption.

Using modeling for three climates, NREL estimates that embodiments of air conditioning systems presented herein may result in an energy savings of 22% compared to window-mounted air conditioners. FIG. 18a illustrates energy savings simulations of air conditioning systems per some embodiments (disclosure) as described herein relative to a window air conditioner (WAC) in Phoenix, Ariz. The simulated space was 400 sqft which is representative of the floor area that would be conditioned by these products. Construction was typical of 1980's homes. Cooling energy savings is over 20%, estimated utility bill savings is $35/year as illustrated by FIG. 18b. Utility bill savings includes heating and cooling energy and accounts for reductions in unwanted air infiltration to the living space.

Based on energy simulation results, if all room air conditioners (window-mounted and portable air conditioners) in the nation were immediately replaced with air conditioning systems per some embodiments as described herein, the savings may be 0.5 quads of energy at the source, or about 2.3% of U.S. residential energy consumption. That would avoid the emissions of 9.3 million tons of carbon dioxide per year, the equivalent of removing 2.1 million vehicles from the road. Likewise, displacing the sales of room air conditioners with air conditioning systems per some embodiments as described herein may result in annual energy savings of 0.09 quads, or 0.4% of U.S. residential energy consumption. That would avoid the emissions of 1.7 million tons of carbon dioxide per year, the equivalent of removing 385,000 vehicles from the road each year. In addition, the impact to the homeowner, landlord, or tenant can be significant. The energy savings per unit is estimated to be 3.9 million Btu per year, or 1,130 kilowatt-hours. With the average residential retail price of electricity at 12.67 cents per kilowatt-hour for 2015, the savings adds up to about $143 per year. Considering that most air conditioning use occurs during the hottest months of summer, the savings for low-income households can definitely help make ends meet.

EXAMPLES

Example 1

A system that includes a first unit that includes a condenser or an evaporator, a sleeve extending from an outside surface of the first unit, and at least one of a drive mechanism, an electrical line, and/or a fluid line physically attached to the first unit. The sleeve extends in a longitudinal direction that is substantially perpendicular to the outside surface of the first unit, the sleeve has an outside wall defining an internal cavity, and the at least one of the drive mechanism, the electrical line, and or the fluid line are positioned within the internal cavity.

Example 2

The system of Example 1, further including a second unit including a condenser when the first unit includes an evaporator, or an evaporator when the first unit includes a condenser, a channel positioned within the second unit, and at least one of a drive receiver, an electrical line connector, and/or a fluid line connector physically attached to the second unit. The channel extends in a longitudinal direction that is substantially perpendicular to an outside surface of the second unit, the channel has an opening through the outside surface of the second unit, and the channel terminates with a face plate positioned within the second unit. The at least one of the drive receiver, the electrical line connector, and/or the fluid line connector are positioned on the face plate and the at least one of the drive receiver, the electrical line connector, and/or the fluid line connector are configured to align with and attach to the at least one of the drive mechanism, the electrical line and/or the fluid line.

Example 3

The system of Example 2, where the sleeve is positioned within the channel, the longitudinal direction of the channel is aligned with the longitudinal direction of the sleeve, and the at least one of the drive receiver, the electrical line connector, and/or the fluid line connector are attached at the face plate to the at least one of the drive mechanism, the electrical line and/or the fluid line.

Example 4

The system of Example 1, where the sleeve may include a receiving hole that passes through the outside wall.

Example 5

The system of Example 4, where the channel may include an arrest mechanism configured to reversibly move into and out of the receiving hole.

Example 6

The system of Example 1, where the sleeve may include a receiving groove positioned on an outside surface of the outside wall.

Example 7

The system of Example 6, where the channel may include an arrest mechanism configured to reversibly move into and out of the receiving hole.

Example 8

The system of Example 1, where the sleeve may include a guiding edge positioned on an outside surface of the outside wall.

Example 9

The system of Example 8, where the channel may include a guiding groove configured to align with and receive the guiding edge, so that alignment of the guiding groove and the guiding edge may align the at least one of the drive receiver, the electrical line connector, and/or the fluid line connector with the at least one of the drive mechanism, the electrical line and/or the fluid line.

Example 10

The system of Example 2, where the drive mechanism may be splined.

Example 11

The system of Example 10, where the drive receiver may have recesses configured to receive the splined drive mechanism.

Example 12

The system of Example 2, where the at least one of the drive receiver, the electrical line connector, and/or the fluid line connector may attach to the at least one of the drive mechanism, the electrical line and/or the fluid line attach by moving the sleeve into the channel.

Example 13

A system that includes a first unit, an second unit physically separated from the first unit, a drive mechanism, and a connecting mechanism between the first unit and the second unit, wherein the drive mechanism passes through the connecting mechanism.

Example 14

The system of Example 13, that may further include a motor, where the first unit may include a first fan, the second unit may include a second fan, and the first fan and the second fan are both driven by the motor.

Example 15

The system of Example 14, where the first unit may contain the motor, and the drive mechanism may connect the motor and the second fan.

Example 16

The system of Example 14, where the first unit may contain the motor, and the drive mechanism may connect the motor and the first fan.

Example 17

The system of Example 13, where the drive mechanism may be a mechanical shaft.

Example 18

The system of Example 13, where the first unit may be a condenser unit and the second unit may be an evaporator unit.

Example 19

The system of Example 13, where the first unit may be an evaporator unit and the second unit may be a condenser unit.

Example 20

A first part for a connector that includes a longitudinal axis with a proximal direction and a distal direction, a wall with a length defined by a proximal end and a distal end, the wall aligned along and positioned around the longitudinal axis to form an internal fluid channel, and a plug positioned and configured to move within the internal fluid channel and centered along the longitudinal axis, the plug having a first contact surface positioned substantially perpendicular to the longitudinal axis and facing the distal direction. The fluid channel has a narrow diameter portion that includes the distal end of the wall, and the fluid channel has a wide diameter portion proximal to the narrow radius portion, where the wide diameter portion is connected to the narrow diameter portion by a tapered portion of the fluid channel, together forming a continuous inside surface of the wall. The distal end of the wall has a second contact surface substantially perpendicular to the longitudinal axis and facing the distal direction. The plug has a first position, where the plug is positioned within the narrow diameter portion of the fluid channel to form a fluid seal between the plug and the inside surface of the wall. The plug has a second position, where the plug is positioned within the wide diameter to allow fluid flow through the fluid channel, and the plug is reversibly movable between the two positions along the longitudinal axis.

Example 21

A second part for a connector that includes a longitudinal axis with a proximal direction and a distal direction, a wall with an inside surface and a length defined by a proximal end and a distal end, the wall aligned along and positioned around a longitudinal axis to form an internal fluid channel, and a plug positioned within the internal fluid channel and centered along the longitudinal axis, the plug having a first contact surface positioned substantially perpendicular to the longitudinal axis and facing the proximal direction. The second part includes a ring positioned concentrically around the longitudinal axis and configured to move within the internal fluid channel, the ring having a second contact surface positioned substantially perpendicular to the longitudinal axis and facing the proximal direction. The ring has a first position, where the ring is positioned between the inside surface of the wall and the stationary plug to form a fluid seal between the plug and the inside surface of the wall. The ring has a second position, where the ring is positioned away from the stationary plug, in the distal direction of the longitudinal axis, to allow fluid flow through the fluid channel, and the ring is reversibly moveable between the two positions along the longitudinal axis.

Example 22

A connector that includes a longitudinal axis with a proximal direction and a distal direction, a first part as described in Example 20 and a second part as described in claim 21, where the first part and the second part are connected by a first interface between the second contact surface of the wall of the first part, and the second contact surface of the ring of the second part, to form a fluid seal between the first part and second part, and the first part and the second part are connected at a second interface between the first contact surface of the plug of the first part, and the first contact surface of the plug of the second part, to form a continuous fluid channel from the distal end of the wall of the second part to the proximal end of the wall of the first part.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device comprising:
   a housing having an external surface and defining an interior volume;
   a heat exchanger positioned within the interior volume;
   a fluid line partially positioned within the interior volume;
   a sleeve extending from the external surface and terminating at a distal end of the sleeve, and
   a fluid connector, wherein:
   the sleeve has an outside wall spanning a length of the sleeve and defining an internal cavity,
   the outside wall comprises a receiving hole,
   the receiving hole passes completely through the outside wall,
   the fluid connector is positioned at the distal end,
   a portion of the fluid line is positioned within the internal cavity, and
   the fluid line provides a fluid connection between the heat exchanger and the fluid connector.

2. The device of claim 1, further comprising:
   a guiding edge positioned on the outside wall of the sleeve, wherein:
   the guiding edge is substantially parallel with the length of the sleeve.

3. The device of claim 1, wherein the sleeve is positioned substantially perpendicular relative to the external surface.

4. The device of claim 1, further comprising:
   a connecting head, wherein:
   the connecting head is positioned at the distal end of the sleeve, and
   the fluid connector is positioned at a fixed position on the connecting head.

5. The device of claim 1, wherein:
   the sleeve comprises a first connector tube and a second connector tube,
   the first connector tube has a first end and a second end that defines a first length,
   the first connector tube has a first wall that spans the first length and defines a first internal cavity,
   the second connector tube has a first end and a second end that defines a second length,
   the second connector tube has a second wall that spans the second length and defines a second internal cavity,
   the first connector tube has a receiving hole positioned in the first wall,
   the second connector tube has an arrest mechanism,
   the arrest mechanism is reversibly movable from a locked position within the receiving hole, to an unlocked position outside of the receiving hole, and
   the first connector tube is movable with respect to the second connector tube when the arrest mechanism is in the unlocked position.

6. The device of claim 1, further comprising:
   a motor and a fan, wherein:
   the motor and the fan are positioned within the interior volume, and
   the fan is mechanically coupled to the motor by a drive mechanism.

7. The device of claim 1, wherein:
   the fluid line comprises a liquid line and a vapor line, each of which is connected to the heat exchanger,
   the connector comprises a first connector and a second connector,
   the vapor line attaches to the first fluid connector, and
   the liquid line attaches to the second fluid connector.

8. A device comprising:
   a housing having an external surface and defining an interior volume;
   a heat exchanger positioned within the interior volume;
   a fluid line positioned within the interior volume;
   a channel extending into the interior volume from the external surface;
   a face plate; and
   a fluid connector positioned at least partially within the channel, wherein:
   the fluid line provides a fluid connection between the heat exchanger and the fluid connector,
   the channel terminates with the face plate at the end of the channel that is within the interior volume, and
   the fluid connector is positioned at a fixed position on the face plate.

9. The device of claim 8, wherein:
   the channel defines an inside wall, and
   an arrest mechanism is positioned within the inside wall.

10. The device of claim 9, further comprising:
    a guiding groove positioned on the inside wall of the channel, wherein:
    the guiding groove is substantially parallel with the channel.

11. The device of claim 8, wherein the channel is positioned substantially perpendicular relative to the external surface.

12. The device of claim 8, further comprising:
    a motor and a fan, wherein:
    the motor and the fan are positioned within the interior volume, and
    the fan is mechanically coupled to the motor by a drive mechanism.

13. The device of claim 8, wherein:
    the fluid line comprises a liquid line and a vapor line, each of which is connected to the heat exchanger,
    the connector comprises a first connector and a second connector,
    the vapor line attaches to the first fluid connector, and
    the liquid line attaches to the second fluid connector.

* * * * *